(12) United States Patent
Elias

(10) Patent No.: US 9,961,489 B2
(45) Date of Patent: May 1, 2018

(54) SYSTEM AND METHOD FOR TRACKING INDIVIDUALS

(71) Applicant: Global Net Solutions, Inc., Torrance, CA (US)

(72) Inventor: Michael Elias, Torrance, CA (US)

( * ) Notice: Subject to any disclaimer, the term of this patent is extended or adjusted under 35 U.S.C. 154(b) by 0 days. days.

(21) Appl. No.: 15/644,518

(22) Filed: Jul. 7, 2017

(65) Prior Publication Data
US 2018/0014150 A1 Jan. 11, 2018

Related U.S. Application Data

(60) Provisional application No. 62/360,444, filed on Jul. 10, 2016.

(51) Int. Cl.
*G08B 1/08* (2006.01)
*H04W 4/02* (2018.01)
(Continued)

(52) U.S. Cl.
CPC .......... *H04W 4/02* (2013.01); *G07C 9/00111* (2013.01); *H04W 12/06* (2013.01)

(58) Field of Classification Search
CPC ....... H04W 4/02; H04W 4/008; H04W 4/023; H04W 12/06; G06F 9/00111
(Continued)

(56) References Cited

U.S. PATENT DOCUMENTS 8,332,063 B2* 12/2012 Moshier ................. G06Q 10/06 307/326
9,185,517 B2* 11/2015 Kuhl ....................... H04W 4/02
(Continued)

FOREIGN PATENT DOCUMENTS

WO    WO 2015/170253    11/2015

OTHER PUBLICATIONS

International Search Report and Written Opinion for International Application No. PCT/US2017/041253 dated Oct. 19, 2017 in 14 pages.

*Primary Examiner* — John A Tweel, Jr.
(74) *Attorney, Agent, or Firm* — Knobbe, Martens, Olson & Bear LLP

(57) ABSTRACT

A tracking device and a method of tracking are provided. The tracking device includes a first location tracking circuit, a second location tracking circuit, at least one biometric identification circuit, a data storage device, and a processor. The first location tracking circuit is configured to wirelessly communicate with at least one wireless location system and to generate at least one first signal indicative of a location of the tracking device using wireless communications with the at least one wireless location system. The second location tracking circuit is configured to wirelessly communicate with at least one wireless local-area network and to generate at least one second signal indicative of the location using wireless communications with the at least one wireless local-area network. The at least one biometric identification circuit is configured to detect at least one biometric characteristic of a user. The processor is configured to: generate information regarding the location in response at least in part to one or both of the at least one first signal and the at least one second signal, and determine whether the user is an authorized user of the tracking device.

20 Claims, 19 Drawing Sheets

(51) Int. Cl.
*H04W 12/06* (2009.01)
*G07C 9/00* (2006.01)

(58) Field of Classification Search
USPC .................................................. 340/539.13
See application file for complete search history.

(56) References Cited

U.S. PATENT DOCUMENTS

| | | |
|---|---|---|
| 9,311,586 B2* | 4/2016 | Robinette .......... G08B 13/1427 |
| 9,384,518 B2* | 7/2016 | Chung ................. G06Q 50/265 |
| 2008/0238613 A1* | 10/2008 | Salva Calcagno ... G06K 9/0008 |
| | | 340/5.83 |
| 2009/0224869 A1 | 9/2009 | Aggarwal et al. |
| 2009/0224909 A1 | 9/2009 | Derrick et al. |
| 2015/0348006 A1 | 12/2015 | Taveau et al. |
| 2016/0050202 A1 | 2/2016 | Swallow |
| 2016/0358162 A1* | 12/2016 | Park ........................ H04W 4/12 |

* cited by examiner

SYSTEM AND METHOD FOR TRACKING INDIVIDUALS

CROSS-REFERENCE TO RELATED APPLICATIONS

This application claims the benefit of priority to U.S. Provisional Appl. No. 62/360,444, filed Jul. 10, 2016 and incorporated in its entirety by reference herein.

BACKGROUND

Field

This application is generally directed to systems and methods for tracking individuals, and more specifically, to systems and methods for tracking individuals authorized to access secured areas.

Description of the Related Art

Security identification cards are well known and used frequently. These cards generally have magnetic strips that contain, for example, a user's identification information. In addition, these cards may provide access to credit, financial information, secure portions of a building, and secure personal medical information. For example, smart health cards can improve the security and privacy of patient information, provide a secure carrier for portable medical records, reduce health care fraud, support new processes for portable medical records, provide secure access to emergency medical information, enable compliance with government initiatives (e.g., organ donation) and mandates, and provide the platform to implement other applications as needed by the health care organization. The advantage of smart cards is that they can be used to store new information or to update existing information. Accordingly, smart cards typically are used in places where more than simply storage of a user's information is desired.

U.S. Pat. Nos. 6,883,715; 6,557,752; and 4,874,935 disclose different types of smart cards, however, each of these smart cards suffers from disadvantages. For example, the reader devices for reading such smart cards are physically connected to the computing device. However, the physical connection creates some disadvantages such as bulkiness and difficulty in carrying them. In addition, users tend to forget to remove the smart card from the reader device at the end of the usage of the smart card.

With regard to tracking, known tracking devices generally have poor accuracy, suffer from long-range communications problems, and do not typically have long term battery life while being used. In addition, known tracking devices utilize high power backhauling on a cellular infrastructure that is not accurate, especially if tracking is being performed in a building or underground.

SUMMARY

In certain embodiments, a tracking device is provided, the tracking device comprising a first location tracking circuit, a second location tracking circuit, at least one biometric identification circuit, a data storage device, and a processor. The first location tracking circuit is configured to wirelessly communicate with at least one wireless location system and to generate at least one first signal indicative of a location of the tracking device using wireless communications with the at least one wireless location system. The second location tracking circuit is configured to wirelessly communicate with at least one wireless local-area network and to generate at least one second signal indicative of the location of the tracking device using wireless communications with the at least one wireless local-area network. The at least one biometric identification circuit is configured to detect at least one biometric characteristic of a user and to generate at least one third signal indicative of the at least one biometric characteristic of the user. The data storage device is configured to store at least one fourth signal indicative of at least one biometric characteristic of an authorized user of the identification device. The processor is in operative communication with the first location tracking circuit, the second location tracking circuit, the at least one biometric identification circuit, and the data storage device. The processor is configured to: generate information regarding the location of the tracking device in response at least in part to one or both of the at least one first signal and the at least one second signal, and determine whether the user is an authorized user of the tracking device in response at least in part to a comparison of the at least one third signal and the at least one fourth signal.

In certain embodiments, the at least one wireless location system comprises a global positioning and navigation satellite network system and the at least one wireless local-area network comprises at least one of a WiFi network and a Bluetooth network. In certain embodiments, the tracking device further comprises a communication circuit in operable communication with the processor. The communication circuit is configured to be in operable communication with a wireless wide-area network in operable communication with a location tracking system. The processor is further configured to transmit the information regarding the location of the tracking device via the communication circuit to the location tracking system. In certain such embodiments, the wireless wide-area network comprises a LoRa wide-area network.

In certain embodiments, a method of tracking is provided. The method comprises wirelessly communicating with at least one wireless location system. The method further comprises generating at least one first signal indicative of a location of a tracking device using wireless communications with the at least one wireless location system. The method further comprises wirelessly communicating with at least one wireless local-area network. The method further comprises generating at least one second signal indicative of the location of the tracking device using wireless communications with the at least one wireless local-area network. The method further comprises detecting at least one biometric characteristic of a user. The method further comprises generating at least one third signal indicative of the at least one biometric characteristic of the user. The method further comprises determining whether the user is an authorized user in response at least in part to a comparison of the at least one third signal and at least one previously-stored fourth signal indicative of at least one biometric characteristic of an authorized user. The method further comprises generating information regarding the location of the tracking device in response at least in part to one or both of the at least one first signal and the at least one second signal.

In certain embodiments, the at least one wireless location system comprises a global positioning and navigation satellite network system and the at least one wireless local-area network comprises at least one of a WiFi network and a Bluetooth network. In certain embodiments, the method further comprises transmitting the information regarding the location of the tracking device to a location tracking system via a communication circuit in communication with a wide-area network in communication with the location tracking system. In certain such embodiments, the wireless wide-area network comprises a LoRa wide-area network. In certain embodiments generating the information regarding the location of the tracking device is performed in response to determining that the user is an authorized user.

The paragraphs above recite various features and configurations of one or more systems and methods that have been contemplated by the inventor(s). It is to be understood that the inventor(s) have also contemplated systems and methods which comprise combinations of these features and configurations from the above paragraphs, as well as systems and methods which comprise combinations of these features and configurations from the above paragraphs with other features and configurations disclosed in the following paragraphs.

DETAILED DESCRIPTION

Figure 1:
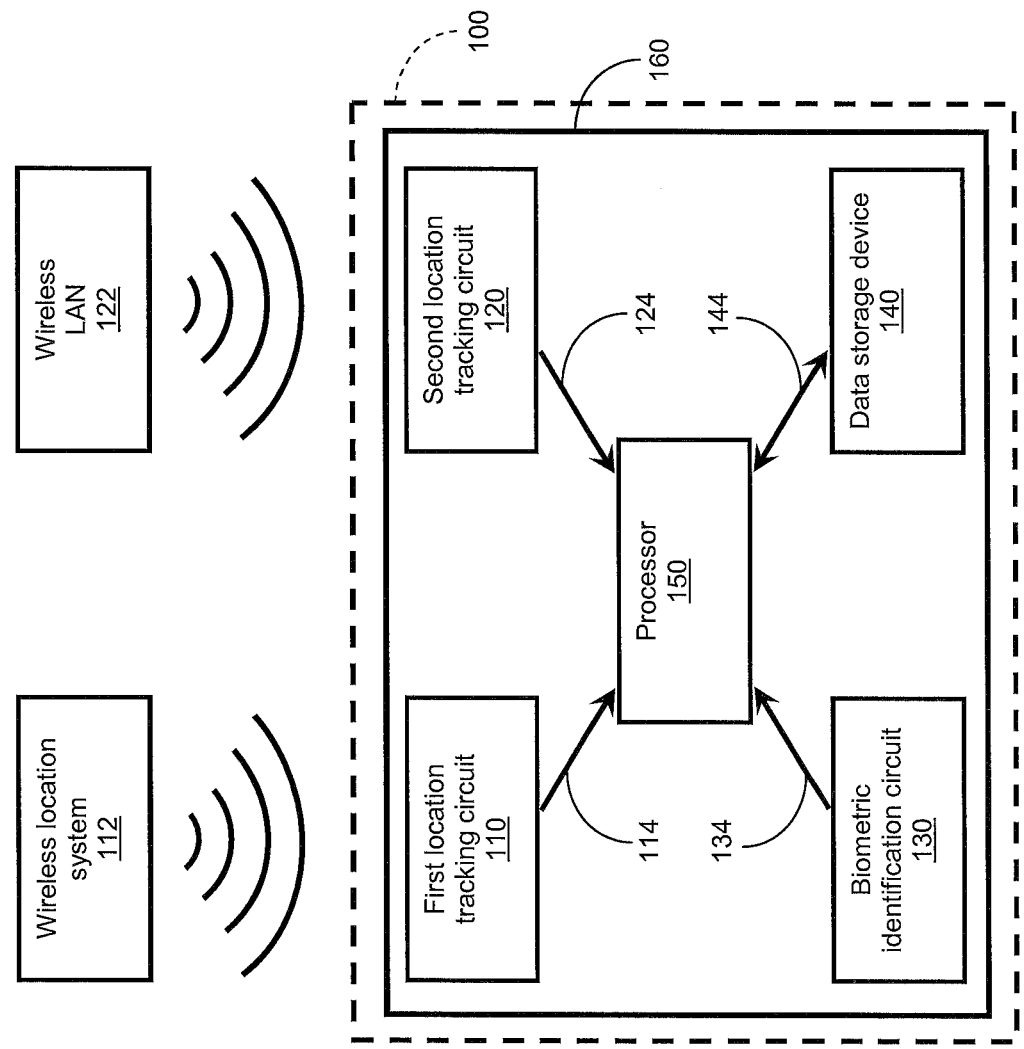
FIG. 1 schematically illustrates an example tracking device in accordance with certain embodiments described herein.

In view of the large potential use of smart card and/or tracking devices, certain embodiments described herein provide a device that allows rapid mass production and personalization of such smart card and/or tracking devices. Moreover, certain embodiments described herein provide a device wherein the data may be readily stored, altered, retrieved, and protected. In addition, certain embodiments described herein provide a device which can be readily adapted to different applications as they arise. Also, certain embodiments described herein provide a device which is secure and resistant to tampering. Certain embodiments described herein provide a device that does not utilize a physical attachment for the reader device to the computing device, such as a portable reader device. Certain embodiments described herein also provide a device which have longer battery life, and are more accurate, even if tracking is being performed in a building or underground.

Certain embodiments described herein provide a device (e.g., a smart secure identification device) to be used in conjunction with a location tracking system (e.g., a server-based location tracking system) and that provides improved tracking in real-time using low power components that excel in high-density applications, including indoor and outdoor uses for both short and long range. For example, certain embodiments described herein utilize systems designed for long range, low bandwidth, and low power consumption (e.g., LPWWAN) to provide various advantages, including but not limited to, running costs that are 10-20 times less than the cost of cellular plan subscriptions, feasibility for building and owning inexpensive private infrastructure, long battery life due to low power consumption, and small form factor (e.g., size of a credit card). Certain embodiments described herein provide increased security by utilizing biometric sensing (e.g., an attached fingerprint scanner), making authentication easy and effortless. Furthermore, certain embodiments described herein can track people more conveniently, efficiently, and accurately (e.g., for prison inmate registration; employee clocking procedures).

Certain embodiments can combine real-time indoor and outdoor precise location determination that gets transmitted over a long range by the device (e.g., a secure, smart, slim, low power, yet cost-effective wireless wearable card). Certain embodiments can be used in any environment of any size serving high-density applications with long-range, low-power operating conditions. For example, an outdoor gateway of more than a five-mile radius can be covered with a clear level of service (LOS), and an indoor gateway of a 1.5-mile radius can be covered (e.g., in home scenarios).

Certain embodiments are compatible with various example applications. In conjunction with public networks in a consumer context, the device can be used to track Alzheimer's patients, children, or personal assets. In conjunction with public networks in an enterprise context, the device can be used to track police officers, to track emergency responders, and for fleet management. In conjunction with private networks in a consumer context, the device can be used for tracking pets (e.g., within a one-mile radius area), children (e.g., within a one-mile radius area), and for emergency distress alarms for the elderly. In conjunction with private networks in an enterprise context, the device can be used in airports (e.g., tracking personnel, assets, and baggage), for education campus safety, prison inmate tracking and registration, and employee clocking and registration.

FIG. 1 schematically illustrates an example tracking device 100 in accordance with certain embodiments described herein. The tracking device 100 comprises a first location tracking circuit 110 configured to wirelessly communicate with at least one wireless location system 112 and to generate at least one first signal 114 indicative of a location of the tracking device 100 using wireless communications with the at least one wireless location system 112. The tracking device 100 further comprises a second location tracking circuit 120 configured to wirelessly communicate with at least one wireless local-area network (LAN) 122 and to generate at least one second signal 124 indicative of the location of the tracking device 100 using wireless communications with the at least one wireless LAN 122. The tracking device 100 further comprises at least one biometric identification circuit 130 configured to detect at least one biometric characteristic of a user and to generate at least one third signal 134 indicative of the at least one biometric characteristic of the user. The tracking device 100 further comprises a data storage device 140 configured to store at least one fourth signal 144 indicative of at least one biometric characteristic of an authorized user of the identification device. The tracking device 100 further comprises a processor 150 in operative communication with the first location tracking circuit 110, the second location tracking circuit 120, the at least one biometric identification circuit 130, and the data storage device 140. The processor 150 is configured to generate information regarding the location of the tracking device 100 in response at least in part to one or both of the at least one first signal 114 and the at least one second signal 124. The processor 150 is further configured to determine whether the user is an authorized user of the tracking device 100 in response at least in part to a comparison of the at least one third signal 134 and the at least one fourth signal 144.

In certain embodiments, the tracking device 100 comprises a housing 160 configured to contain the first location tracking circuit 110, the second location tracking circuit 120, the data storage device 140 within the housing 160, and configured to contain the at least one biometric identification circuit 130 at least partially within the housing 160. For example, as described more fully herein, the at least one biometric identification circuit 130 can comprise one or more biometric sensors (e.g., one or more fingerprint sensors; one or more iris or eyeprint sensors; one or more optical sensors) that are accessible by the user through one or more portions (e.g., orifices; transparent portions) of the housing 160 such that the one or more biometric sensors can detect the corresponding at least one biometric characteristic of the user. In addition, the housing 160 can comprise a material (e.g., plastic) that is configured to allow electromagnetic signals from the at least one wireless location system 112 to reach the first location tracking circuit 110 and configured to allow electromagnetic signals from the at least one wireless LAN 122 to reach the second location tracking circuit 120.

The housing 160 of certain embodiments can provide a waterproof or water-resistant enclosure of the components contained within the housing 160 to protect these components against damage from water or other materials from the surrounding environment. In certain embodiments, the housing 160 has a size and shape configured to be hand-held by the user, contained within a pocket of the user, or worn by the user. For example, the housing 160 can have a size and shape of a small, compact credit card (e.g., rectangular-shaped and configured to contain a printed circuit board having a length of about 80 mm, a width of about 50 mm, and a thickness of about 0.63 mm). Other shapes and dimensions are also compatible with various embodiments described herein. In certain embodiments, the housing 160 is laminated and has a thickness less than 1 mm or a thickness of about 0.76 mm (e.g., approximately the thickness of a conventional credit card).

In certain embodiments, the tracking device 100 comprises at least one printed circuit board (PCB) comprising one or more of the first location tracking circuit 110, the second location tracking circuit 120, the at least one biometric identification circuit 130, the data storage device 140, and the processor 150. For example, one or more of these components of the tracking circuit 100 can be mounted on the at least one PCB which comprises circuitry configured to provide operational connectivity among the one or more components. In certain embodiments, the at least one PCB further comprises additional circuitry configured to provide one or more additional functionalities (e.g., at least one charger circuit configured to supply power to a power storage device of the tracking device 100; an RFID circuit configured to wirelessly transmit at least one identification signal to an RFID system; a muting circuit configured to control operation of the RFID circuit).

In certain embodiments, the first location tracking circuit 110 is configured to receive signals from the at least one wireless location system 112. Since the first location tracking circuit 110 is within the tracking device 100, the location of the first location tracking circuit 110 is the location of the tracking device 100. In certain embodiments, the first location tracking circuit 110 is configured to conduct bi-directional communications with the at least one wireless location system 112 (e.g., by both receiving signals from the at least one wireless location system 112 and transmitting signals to the at least one wireless location system 112), while in certain other embodiments, the first location tracking circuit 110 is configured to only receive signals from the at least one wireless location system 112. In certain embodiments, the first location tracking circuit 110 is configured to generate the at least one signal 114 indicative of the location of the first location tracking circuit 110 in response to the signals received from the at least one wireless location system 112 and to transmit the at least one signal 114 to the processor 150.

In certain embodiments, the at least one wireless location system 112 is configured to facilitate location determination across large areas or regions (e.g., outdoors and indoors; outside and inside of buildings; across cities, states, or countries; across campuses; across government, military, or commercial installations). In certain such embodiments, the at least one wireless location system 112 comprises a global positioning and navigation satellite network system. Examples of global positioning and navigation satellite network systems compatible with certain embodiments described herein include but are not limited to, the United States NAVSTAR global positioning system (GPS), GPS-A, Assisted GNSS, the Russian global navigation satellite system (GLONASS), the Chinese BeiDou-2 system, and the European Union global navigation satellite system (Galileo). The first location tracking circuit 110 of certain such embodiments is further configured to generate information regarding a location of the first location tracking circuit 110 in response to the signals received from the global positioning and navigation satellite network. In certain embodiments, the first location tracking circuit 110 is configured to conduct bi-directional communications with the global positioning and navigation satellite network system (e.g., by both receiving signals from the global positioning and navigation satellite network system and transmitting signals to the global positioning and navigation satellite network system), while in certain other embodiments, the first location tracking circuit 110 is configured to only receive signals from the global positioning and navigation satellite network system. In certain embodiments, the first location tracking circuit 110 can provide accurate and current geographical location information of an entity (e.g., a vehicle; an individual) that contains or carries the tracking device 100.

In certain embodiments, the at least one wireless location system 112 comprises a wireless low-power wide-area network (WAN), and the at least one wireless location system 112 is configured to utilize the wireless low-power WAN for location determination across areas or regions covered by the low-power WAN (e.g., outdoors and/or indoors; inside one or more buildings; across a portion of a city, campus, or government, military, or commercial installation). Examples of communication standards for the wireless low-power WAN that are compatible with certain embodiments described herein include, but are not limited to, LoRa (an open low-power WAN data link standard maintained by the "LoRa Alliance"; see e.g., EP Pat. No. 2763321 and U.S. Pat. No. 7,791,415), Ultra Narrow Band (UNB), DASH7 standard maintained by Haystack Technologies, Long Term Evolution (LTE) Advanced for Machine Type Communications (MTC), NarrowBand IoT, NB-Fi Protocol, and Random Phase Multiple Access (RPMA). The wireless low-power WAN can comprise a central network server and a plurality of terminals (e.g., gateways) at predetermined locations across the area or region covered by the wireless low-power WAN and that are configured to transmit signals (e.g., a plurality of beacon signals). The first location tracking circuit 110 can be configured to receive and process beacon signals from the plurality of terminals to generate the at least one signal 114 indicative of the location of the first location tracking circuit 110 relative to the plurality of terminals. For example, the first location tracking circuit 110 can receive beacon signals from multiple terminals that are in proximity to the first location tracking circuit 110, can determine the received signal strengths (e.g., received signal strength indication or RSSI) of these received beacon signals, and can generate the at least one signal 114 to be indicative of the location of the first location tracking circuit 110 (e.g., containing information regarding the received beacon signals and their received signal strengths). For example, in certain embodiments in which the first location tracking circuit 110 is configured to utilize a LoRa WAN, the tracking device 100 advantageously provides long range connectivity, low power demand (e.g., for long-lived battery operation), low infrastructure cost for volume deployment, and high density tracking capabilities.

In certain embodiments, the at least one wireless location system 112 comprises both a global positioning and navigation system and a wireless low-power WAN. For example, the first location tracking circuit 110 can be configured to receive signals from the global positioning and navigation satellite network system, to receive signals from the wireless low-power WAN, and to generate the at least one first signal 114 indicative of the location of the tracking device 100 using the signals received from both the global positioning and navigation system and the wireless low-power WAN.

In certain embodiments, the second location tracking circuit 120 is configured to receive signals from the at least one wireless LAN 122. Since the second location tracking circuit 120 is within the tracking device 100, the location of the second location tracking circuit 120 is the location of the tracking device 100. In certain embodiments, the second location tracking circuit 120 is configured to conduct bi-directional communications with the wireless LAN 122 (e.g., by both receiving signals from the wireless LAN 122 and transmitting signals to the wireless LAN 122), while in certain other embodiments, the second location tracking circuit 120 is configured to only receive signals from the wireless LAN 122. In certain embodiments, the second location tracking circuit 120 is configured to generate the at least one signal 124 indicative of the location of the second location tracking circuit 120 in response to the signals received from the wireless LAN 122 and to transmit the at least one signal 124 to the processor 150.

In certain embodiments, the at least one wireless LAN 122 is configured to provide location determination across areas or regions covered by the at least one wireless LAN 122 (e.g., indoors; inside a building; across a portion of a city, campus, or government, military, or commercial installation). Examples of communication standards for the at least one wireless LAN 122 that are compatible with certain embodiments described herein include, but are not limited to, a WiFi network, a Zigbee network, and a Bluetooth network. The at least one wireless LAN 122 can comprise a central network server and a plurality of terminals (e.g., gateways) that are configured to transmit signals (e.g., a plurality of beacon signals). The second location tracking circuit 120 can be configured to receive and process beacon signals from the plurality of terminals to generate the at least one signal 124 indicative of the location of the second tracking circuit 120 relative to the plurality of terminals. For example, the second location tracking circuit 120 can receive beacon signals from multiple terminals that are in proximity to the second location tracking circuit 120, can determine the received signal strengths (e.g., received signal strength indication or RSSI) of these received beacon signals, and can generate the at least one signal 124 to be indicative of the location of the second location tracking circuit 120 (e.g., containing information regarding the received beacon signals and their received signal strengths).

Figure 2:
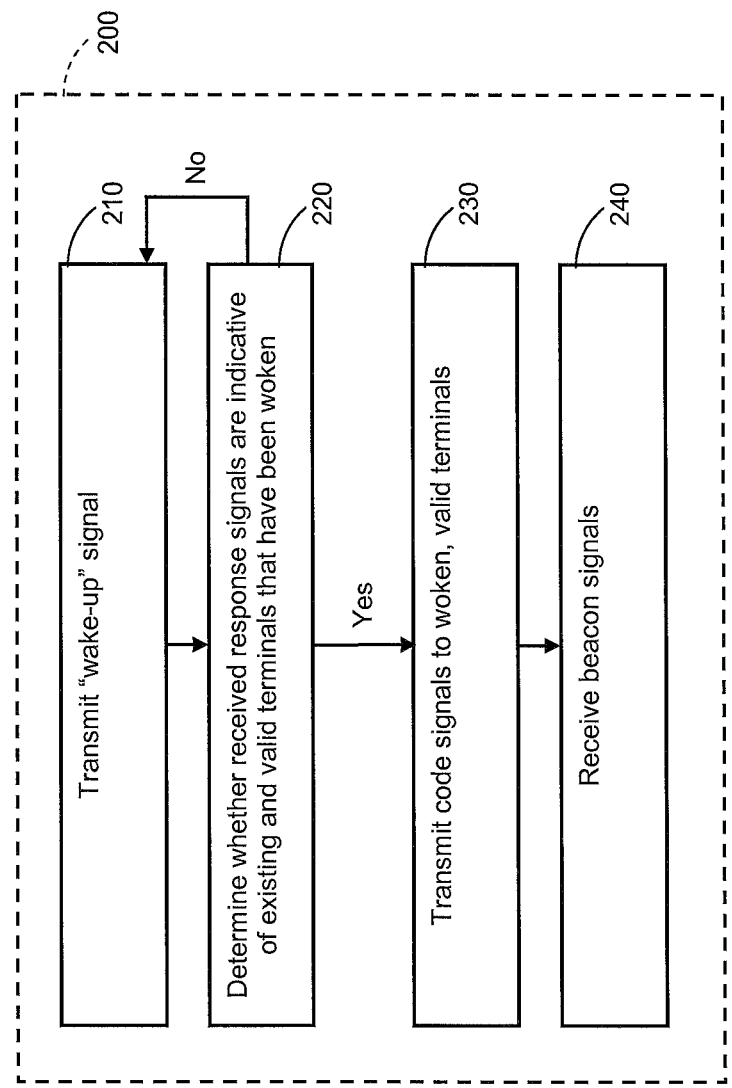
FIG. 2 is a flow diagram of an example method of an example tracking device utilizing smart beacons in accordance with certain embodiments described herein.

In certain embodiments, the second tracking circuit 120 and the at least one wireless LAN 122 are configured to utilize "smart beacons" which are transmitted by the at least one wireless LAN 122 in response to signals received by the at least one wireless LAN 122 from the second tracking circuit 120. FIG. 2 is a flow diagram of an example method 200 of an example tracking device 100 utilizing smart beacons in accordance with certain embodiments described herein. In an operational block 210, the tracking device 100 can transmit (e.g., via the second tracking circuit 120) one or more "wake-up" signals that are received by one or more terminals of the wireless LAN 122. The tracking device 100 can transmit the one or more wake-up signals at predetermined periods of time (e.g., every 5 seconds; every 10 seconds), upon detection of movement of the tracking device 100 (e.g., in response to a signal from an inertial sensor, as described more fully below), or upon the user pressing a button or switch on the tracking device 100. In response to receiving a wake-up signal, the one or more terminals that received the wake-up signal (e.g., woken terminals) can each transmit a response signal that is received by the tracking device 100 (e.g., via the second tracking circuit 120).

In an operational block 220, the tracking device 100 (e.g., the second tracking circuit 120) can use the received response signals to determine whether the received response signals are indicative of existing and valid terminals that have been woken by the wake-up signal. If there are no valid terminals woken, the tracking device 100 can continue to transmit one or more wake-up signals.

If there are one or more valid terminals woken, then in an operational block 230, the tracking device 100 (e.g., the second tracking circuit 120) can transmit a code signal (e.g., a signal comprising a code or secret function known to the valid terminals) that requests that the terminal transmit a beacon signal with information indicative of the terminal (e.g., the terminal's identification; the terminal's predetermined location) back to the tracking device 100 (e.g., over an encrypted link between the terminal and the tracking device 100). In an operational block 240, the tracking device 100 (e.g., the second tracking circuit 120) can receive the beacon signal (e.g., with information regarding the terminal's identification and/or location, and transmitted signal strength) and can determine the received signal strength (e.g., RSSI) of the beacon signal. The second location tracking circuit 120 can generate the at least one signal 124 indicative of the location of the second location tracking circuit 120 (e.g., having information regarding the identification and/or location for each woken, valid terminal, and transmitted signal strength and RSSI for each received beacon signal) and can transmit the at least one signal 124 to the processor 150. As described more fully below, the processor 150 can generate information regarding the location of the tracking device 100 in response to the at least one second signal 124, and the tracking device 100 can transmit (e.g., via a LoRa WAN) the information to a server (e.g., a cloud server) which uses the information to determine the location of the tracking device 100 and provides the location to an operator of the location tracking system (e.g., on a map or other user interface). As used herein, the term "server" is to be given its broadest reasonable interpretation, including but not limited to, a computing device in operable communication with the internet (e.g., a network server; a cloud server).

Adding more terminals in one domain of the wireless LAN 122 can increase the accuracy of location detection using the wireless LAN 122. For example, in certain embodiments, the density of terminals of the wireless LAN 122 across the area or region covered by the wireless LAN 122 can be sufficient to provide an accuracy in the location detection to less than 1 meter. In addition, where there are three or more terminals in one domain of the wireless LAN 122, triangulation can be used to determine the location of the tracking device 100. The number of terminals and their distribution can be selected to provide real-time location determination of the tracking device 100 at a desired level of accuracy.

In certain such embodiments, the wireless LAN 122 (e.g., Bluetooth network) and the second location tracking circuit 120 advantageously provide efficient and accurate indoor tracking capabilities. The tracking device 100 of certain embodiments can further utilize the wireless LAN 122 (e.g., the Bluetooth network) for over-the-air updates, wireless dongle communications for personal authentication, or communication with one or more external devices. For example, the tracking device 100 can achieve over-the-air firmware updates of one or more components of the tracking device 100 and can achieve file transfers over the Bluetooth network while consuming a low amount of power. For another example, transmission over this channel can be used to wipe or erase information from the tracking device 100 (e.g., out-of-date biometric information; personal stored information on a tracking device 100 that has been tampered with, lost, or stolen).

Figure 3A:
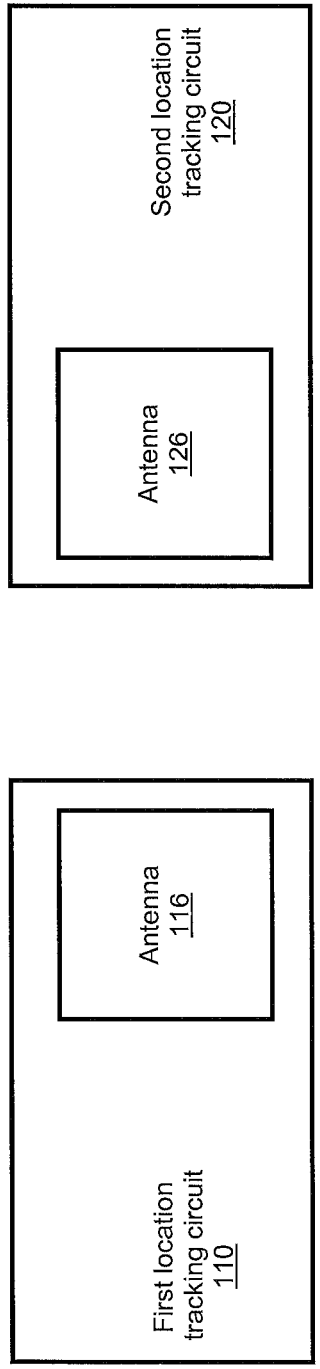
FIGS. 3A and 3B schematically illustrate two example configurations of the first location tracking circuit and the second location tracking circuit in accordance with certain embodiments described herein.
Figure 3B:
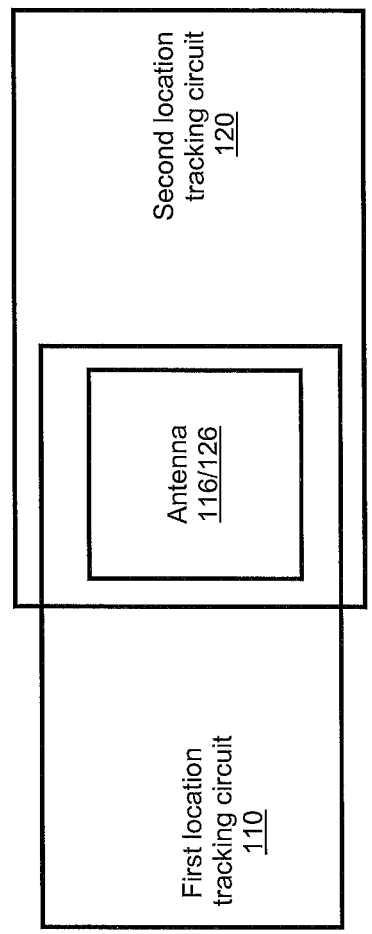

FIGS. 3A and 3B schematically illustrate two example configurations of the first location tracking circuit 110 and the second location tracking circuit 120 in accordance with certain embodiments described herein. As shown in FIG. 3A, the first location tracking circuit 110 comprises at least one antenna 116 and the second location tracking circuit 120 comprises at least one antenna 126, and as shown in FIG. 3B, the first location tracking circuit 110 and the second location tracking circuit 120 comprise a common antenna 116/126 (e.g., a single antenna). For example, in certain embodiments in which the wireless location system 112 comprises a LoRa WAN and the wireless LAN 122 comprises a Bluetooth network, the at least one antenna 116 is configured to receive and/or transmit signals between the first location tracking circuit 110 and the LoRa WAN and the at least one antenna 126 is configured to receive and/or transmit signals between the second location tracking circuit 120 and the Bluetooth network. While the at least one antenna 116 is separate from the at least one antenna 126 in FIG. 3A, the at least one antenna 116 and the at least one antenna 126 are the same as one another in FIG. 3B. In certain such embodiments, the use of a single antenna (e.g., for the first location tracking circuit 110 and the second location tracking circuit 120; as well as for any communication circuit (e.g., a LoRa WAN for communicating location information to a server-based location tracking system, working in both US and EU bands, such as in a range from 850 MHz to 925 MHz) can advantageously provide a smaller form factor and higher efficiency of the tracking device 100.

In certain embodiments, the at least one biometric identification circuit 130 comprises one or more biometric sensors configured to detect at least one corresponding biometric characteristic of the user. For example, the one or more biometric sensors can comprise a fingerprint sensor (e.g., a sensing surface located along a surface of the housing 160 and configured to be contacted by a finger of the user) configured to detect the fingerprint pattern of the user and the biometric identification circuit 130 is configured to generate at least one signal 134 (e.g., template) indicative of the fingerprint pattern of the user and to transmit the at least one signal 134 to the processor 150. In certain embodiments in which the tracking device 100 comprises a push button (e.g., an on/off button; an actuation button), the fingerprint sensor can be incorporated as a surface of the push button. For another example, the one or more biometric sensors can comprise an iris or eyeprint sensor (e.g., an optical sensor or camera configured to be pointed toward the iris of the user) configured to detect an iris pattern of the user and the biometric identification circuit 130 is configured to generate at least one signal 134 (e.g., a template) indicative of the iris pattern of the user and to transmit the at least one signal 134 to the processor 150. For another example, the one or more biometric sensors can comprise a voice sensor (e.g., a microphone) configured to detect a voice pattern of the user and the biometric identification circuit 130 is configured to generate at least one signal 134 (e.g., a template) indicative of the voice pattern of the user and to transmit the at least one signal 134 to the processor 150. Other biometric identification circuits 130 and biometric sensors are also compatible with certain embodiments described herein. In certain embodiments, the at least one biometric identification circuit 130 comprises circuitry configured to translate the physical biometric characteristic (e.g., fingerprint pattern; iris pattern; voice pattern) into a template of binary data and to encrypt the template to prevent unauthorized use.

In certain embodiments, the data storage device 140 comprises one or more computer-readable tangible memory media, including, but not limited to, random-access memory (RAM) integrated circuits, and flash memory integrated circuits, alone or in combination with one another. The data storage device 140 can be configured to receive at least one signal 144 (e.g., biometric data template) from the processor 150 with the at least one signal 144 indicative of one or more biometric characteristics of the user and to store the at least one signal 144 (e.g., in an encrypted form; with no read-back capabilities outside of the authorization process to preserve privacy). For example, an initialization mode of the tracking device 100 is conducted to designate a user as an authorized user of the tracking device 100. During the initialization mode, the one or more biometric characteristics of the user can be detected by the at least one biometric identification circuit 130, the processor 150 can respond to at least one signal 134 by transmitting the at least one signal 144 to the data storage device 140, which stores the at least one signal 144 to be later used during operation to authorize operation of the tracking device 100. Furthermore, in an operation mode of the tracking device 100, the data storage device 140 is configured to transmit the stored at least one signal 144 to the processor 150 (e.g., in response to a query from the processor 150) for use in determining whether a current user of the tracking device 100 is an authorized user of the tracking device 100.

In certain embodiments, the processor 150 comprises one or more integrated circuits configured to control operation of the tracking device 100. Examples of integrated circuits compatible with certain embodiments described herein include, but are not limited to, a digital signal processor (DSP), an application specific integrated circuit (ASIC), a field programmable gate array (FPGA) or other programmable logic device, discrete gate or transistor logic, discrete hardware components, or any combination thereof designed to perform the functions described hereinto. The processor 150 can comprise one or more microprocessors, controllers, microcontrollers, or state machines, and can be implemented as a combination of computing devices (e.g., a combination of a DSP and a microprocessor, a plurality of microprocessors, one or more microprocessors in conjunction with a DSP, or any other such configuration. The processor 150 can be embodied directly in hardware, in a software module executed by an integrated circuit, or in a combination of the two. If implemented in software, the functions of the processor 150 may be stored on or transmitted over as one or more instructions or code on a tangible, non-transitory computer-readable medium, for example, for example by executing routines stored in memory (e.g., in the data storage device 140; in other computer-readable tangible memory media, including, but not limited to, random-access memory (RAM) integrated circuits, read-only memory (ROM) integrated circuits, EPROM circuits, EEPROM circuits, and flash memory integrated circuits, alone or in combination with one another).

In certain embodiments, the processor 150 is configured to generate information regarding the location of the tracking device 100 in response at least in part to one or both of the at least one first signal 114 from the first location tracking circuit 110 and the at least one second signal 124 from the second location tracking circuit 120. The processor 150 is further configured to transmit (e.g., via a LoRa WAN) the information regarding the location of the tracking device 100 to a location tracking system (e.g., a server-based location tracking system), and the location tracking system utilizes the information to determine the location of the tracking device 100.

In certain embodiments, the processor 150 can be configured to determine whether the user is an authorized user of the tracking device 100 in response to a comparison of the at least one third signal 134 and the at least one fourth signal 144. For example, upon the user actuating the at least one biometric identification circuit 130 (e.g., by actuating a push button; by pressing the user's finger to the fingerprint sensor; by taking an image of the user's iris; by recording a voice sample), the processor 150 can receive the at least one third signal 134 from the at least one biometric identification circuit 130, can request and receive the at least one fourth signal 144 from the data storage device 140, and can perform a comparison of the at least one third signal 134 and the at least fourth signal 144. If the at least one third signal 134 matches the at least fourth signal 144 within a predetermined confidence level (e.g., with at least a 90% confidence level; with at least a 95% confidence level; with at least a 99% confidence level), the user is determined to be an authorized user of the tracking device 100, while if the at least one third signal 134 does not match the at least one fourth signal 144 within the predetermined confidence level, the user is determined to not be an authorized user of the tracking device 100. As described herein, depending on whether the user is determined to be an authorized user of the tracking device 100 or not, the processor 150 can further control aspects of the operation of the tracking device 100, thereby providing a more secure usage of the tracking device 100 (e.g., enabling an RFID circuit to transmit an RFID signal to an RFID system to provide door access, mobile payment, or computer logging).

Figure 4:
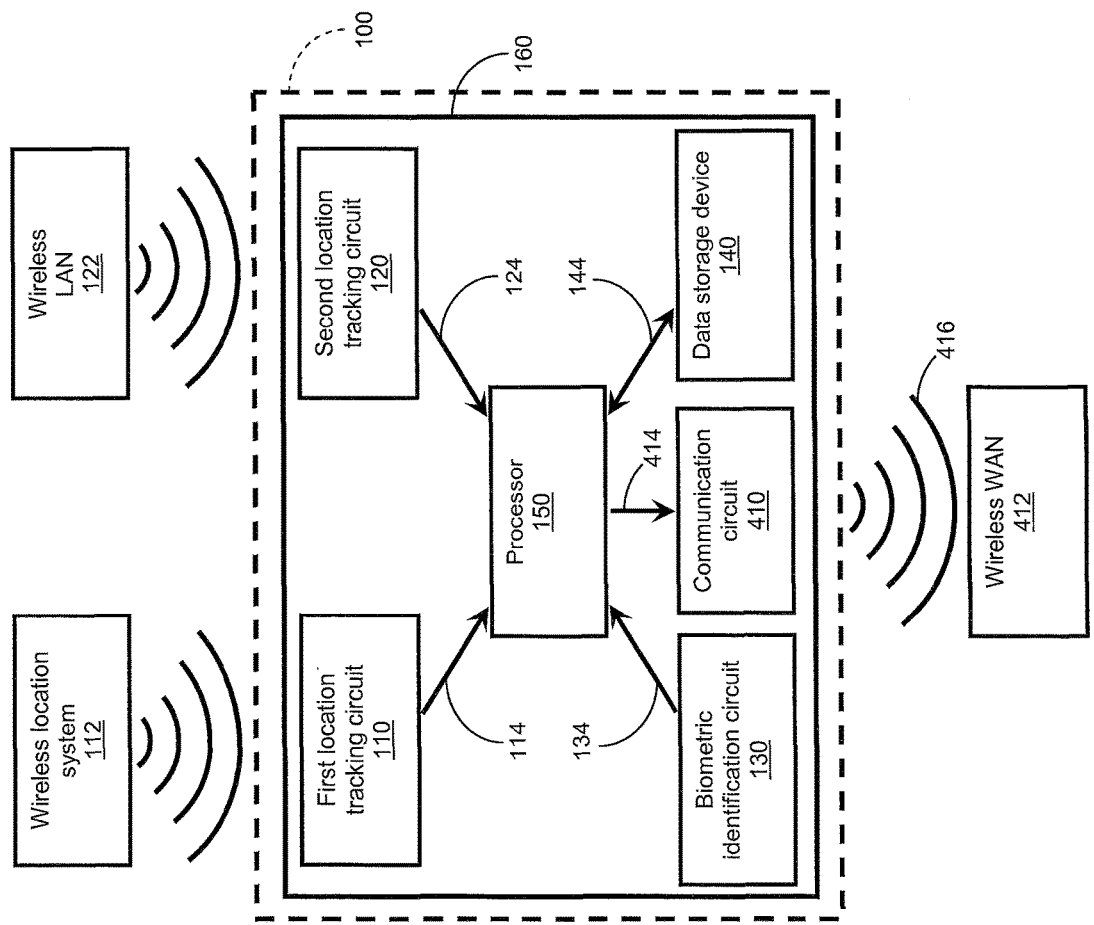
FIG. 4 schematically illustrates an example tracking device comprising a communication circuit configured to communicate with a wireless, low-power WAN in accordance with certain embodiments described herein.

In certain embodiments, the processor 150 can be configured to wirelessly transmit the information regarding the location of the tracking device 100 (generated by the processor 150 in response to one or both of the at least one first signal 114 and the at least one second signal 124) in real time to a location tracking system via a wireless, low-power WAN 412 (e.g., a LoRa WAN). FIG. 4 schematically illustrates an example tracking device 100 comprising a communication circuit 410 configured to communicate with a wireless, low-power WAN 412 in accordance with certain embodiments described herein. The processor 150 is in operative communication with the communication circuit 410 and is configured to transmit signals 414 having information regarding the location of the tracking device 100 to the communication circuit 410. The communication circuit 410 is configured to be in operative communication with the wireless, low-power WAN 412 (e.g., LoRa WAN) and is configured to transmit signals 416 having the information regarding the location of the tracking device 100 to the wireless, low-power WAN 412. The wireless, low-power WAN 412 is in operative communication (e.g., via the internet) with the server-based location tracking system (not shown) and is configured to transmit the information regarding the location of the tracking device 100 to the server-based location tracking system.

In certain embodiments, by utilizing the communication circuit 410 in operative communication with the wireless, low-power WAN 412, the tracking device 100 advantageously provides long range, low power, and high density tracking capabilities in a wider range of environments. Other mobile tracking devices utilizing a global positioning and navigation satellite network for location determination communicate with the location tracking system via high power backhauling on a cellular infrastructure, for example, global system for mobile communications (GSM) channels. However, backhauling communication channels, such as GSM channels, utilize large amounts of power, and such communications can deplete the power stored on the battery of the mobile tracking device, necessitating larger batteries or more frequent charging. In addition, such cellular infrastructure-based communication channels may be unreliable or inaccessible in various usage environments, such as within portions of a building or underground. In contrast, by instead utilizing the wireless, low-power WAN 412 (e.g., LoRa WAN) for communications from the tracking device 100 to the location tracking system (e.g., not utilizing backhauling on a cellular infrastructure; not using cellular infrastructure-based communication channels; not utilizing GSM channels), certain embodiments described herein can advantageously avoid or reduce such high power expenditures, allowing smaller batteries to be used on the tracking devices 100 and allowing less frequent charging. In addition, certain such embodiments can facilitate tracking in usage environments in which cellular infrastructure-based communication channels may be unreliable or inaccessible.

In certain embodiments, the processor 150 can be configured to wirelessly transmit (via the communication circuit 410) the information regarding the location of the tracking device 100 in real time to the location tracking system in response at least in part to the processor 150 determining that the user is an authorized user of the tracking device 100 (e.g., in response at least in part to the comparison of the at least one third signal 134 and the at least one fourth signal 144 being indicative that the user is an authorized user of the tracking device 100).

In certain embodiments, the processor 150 can be configured to control at least one of the first location tracking circuit 110 and the second location tracking circuit 120 in response at least in part to the processor 150 determining that the user is an authorized user of the tracking device 100 (e.g., in response at least in part to the comparison of the at least one third signal 134 and the at least one fourth signal 144 being indicative that the user is an authorized user of the tracking device 100). For example, one or both of the first location tracking circuit 110 and the second location tracking circuit 120 can be controlled by the processor 150 to only be activated if the user is an authorized user of the tracking device 100. In this way, certain embodiments described herein can advantageously preserve power (e.g., battery power) stored by the tracking device 100 by only activating one or both of the first location tracking circuit 110 and the second location tracking circuit 120 upon determining that the user of the tracking device 100 is the authorized user of the tracking device 100.

In certain embodiments, the processor 150 can be configured to control the first location tracking circuit 110 and the second location tracking circuit 120 to advantageously utilize the second location tracking circuit 120 to search for existing and valid terminals in the proximity of the tracking device 100 (e.g., as described above with regard to FIG. 2) before utilizing the first location tracking circuit 110. If no valid terminals respond to the "wake-up" signal, the processor 150 can then utilize the first location tracking circuit 110. By attempting to perform the "indoor" tracking provided by the wireless LAN 122 before attempting to perform the "outdoor" tracking provided by the wireless location system 112, certain embodiments described herein can advantageously conserve power stored on the tracking device 100, facilitating longer use between charging events.

In certain embodiments, the location tracking system (e.g., a server-based location tracking system) is configured to utilize the information regarding the location of the tracking device 100 received from the tracking device 100 to determine the location of the tracking device 100. For example, the information received from the tracking device 100 can include information derived from the wireless location system 112 (e.g., the global positioning and navigation satellite network), information derived from the wireless LAN 122 (e.g., terminal identifications and/or locations and beacon signals RSSIs), and the location tracking system can use the received information and appropriate techniques (e.g., triangulation) to determine the location of the tracking device 100 (e.g., in real-time).

Figure 5A:
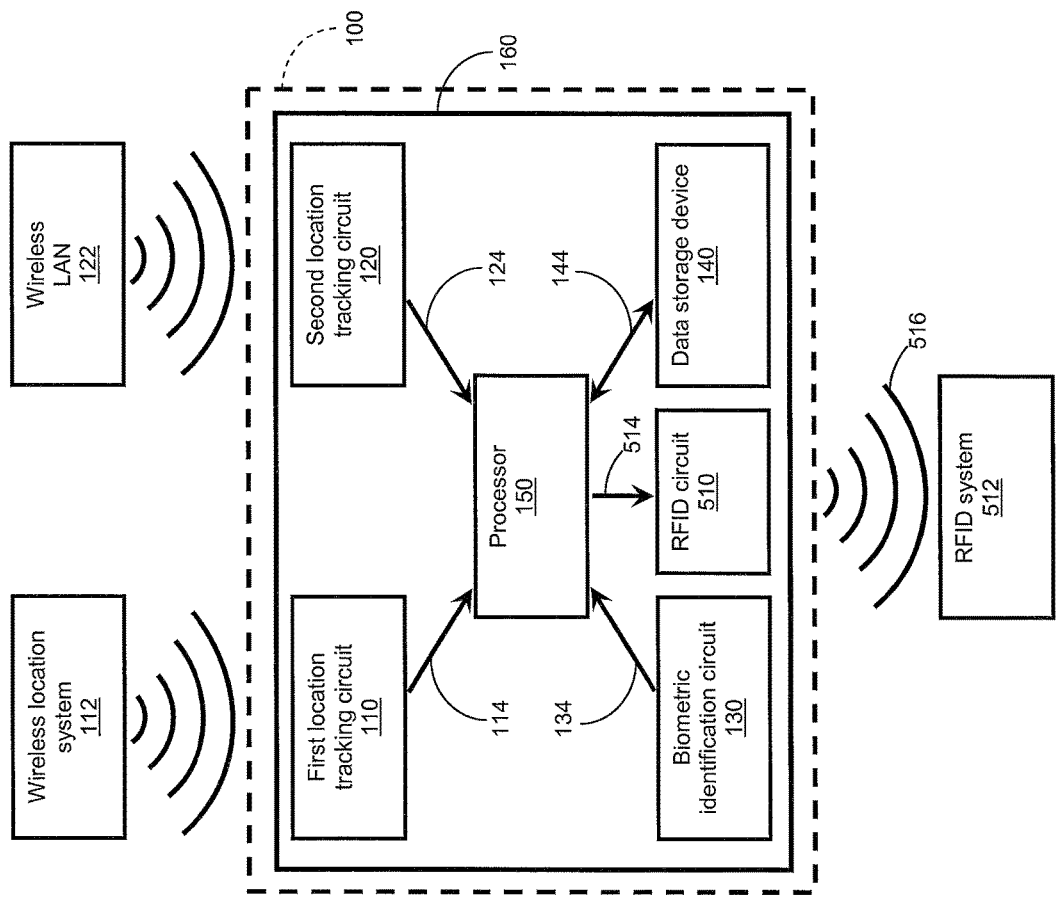
FIG. 5A schematically illustrates an example tracking device for use with a radio-frequency identification system in accordance with certain embodiments described herein.

FIG. 5A schematically illustrates an example tracking device 100 for use with a radio-frequency identification system 512 in accordance with certain embodiments described herein. The example tracking device 100 of FIG. 5A comprises a radio-frequency identification (RFID) circuit 510 in operative communication with the processor 150. The RFID circuit 510 is configured to receive at least one control signal 514 from the processor 150 and is configured to wirelessly transmit at least one identification signal 516 to an RFID system 512. For example, the RFID system 512 can be securing a restricted area (e.g., an area in which access is only permitted for personnel authorized to access the area), examples of which include, but are not limited to, selected areas of hospitals, airports, prisons, military facilities, government facilities, industrial facilities, and corporate facilities.

Figure 5B:
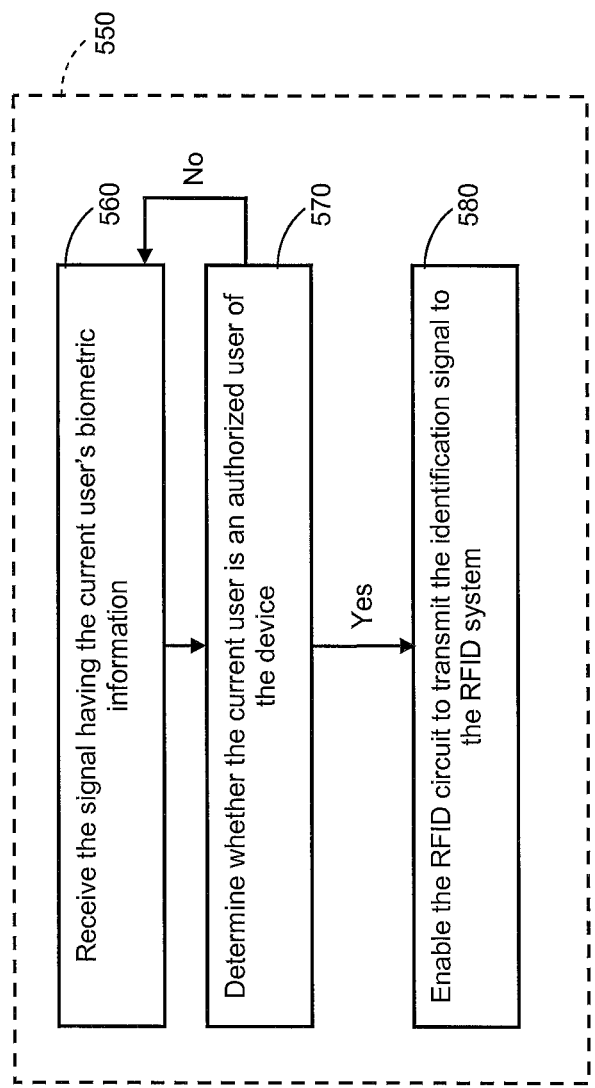
FIG. 5B is a flow diagram of an example method of an example tracking device utilizing user authorization to control RFID access in accordance with certain embodiments described herein.

In certain embodiments, the RFID system 512 is configured to allow the user to access the restricted area (e.g., by unlocking a door; by logging onto a computer system) in response at least in part to the at least one identification signal 516 indicating that the authorized user of the tracking device 100 is authorized to access the restricted area. The processor 150 of certain embodiments is further configured to control transmission of the at least one identification signal 516 by the RFID circuit 510 to the RFID system 512 (e.g., by utilizing the at least one control signal 514). FIG. 5B is a flow diagram of an example method 550 of an example tracking device 100 utilizing user authorization to control RFID access in accordance with certain embodiments described herein. In an operational block 560, the processor 150 receives from the biometric identification circuit 130 the at least one signal 134 having the current user's biometric information. In an operational block 570, the processor 150 determines whether the current user is an authorized user of the tracking device 100 by comparing the received current user's biometric information to the stored biometric information of the authorized user of the tracking device 100. If the user is determined to not be an authorized user of the tracking device 100, then the processor 150 does not activate the RFID circuit 510. In certain embodiments, the processor 150 can try again by receiving another third signal 134 from the biometric identification circuit 130. If the user is determined to be an authorized user of the tracking device, in an operational block 580, the processor 150 enables the RFID circuit 510 to transmit the at least one identification signal 516 to the RFID system 512.

The processor 150 of certain embodiments can control transmission of the at least one identification signal 516 by the RFID circuit 510 by allowing the transmission when the user is an authorized user of the tracking device 100 (e.g., when the at least one third signal 134 matches the at least one fourth signal 144 within a predetermined confidence level) and preventing transmission of the at least one identification signal 516 by the RFID circuit 510 when the user is not an authorized user of the tracking device 100 (e.g., when the at least one third signal 134 does not match the at least fourth signal 144 within a predetermined confidence level). In this way, certain embodiments described herein can advantageously preserve power (e.g., battery power) stored by the tracking device 100 by only activating the RFID circuit 510 upon determining that the user of the tracking device 100 is the authorized user of the tracking device 100. Furthermore, certain embodiments described herein can advantageously provide enhanced security by only allowing the RFID circuit 510 to transmit the at least one identification signal 516 upon determining that the user of the tracking device 100 is the authorized user of the tracking device 100.

Figure 6A:
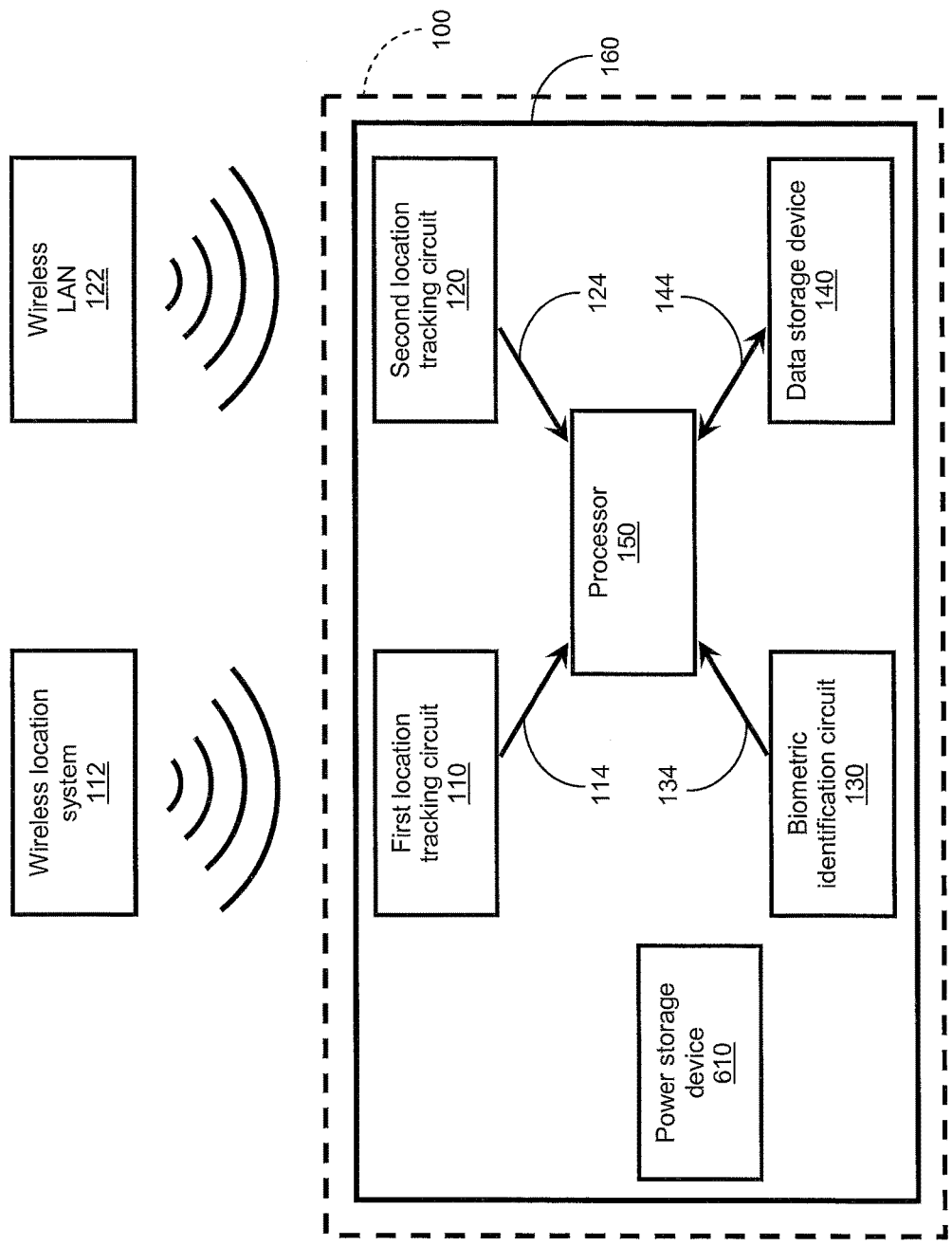
FIGS. 6A-6C schematically illustrate example tracking devices comprising a power storage device in accordance with certain embodiments described herein.
Figure 6B:
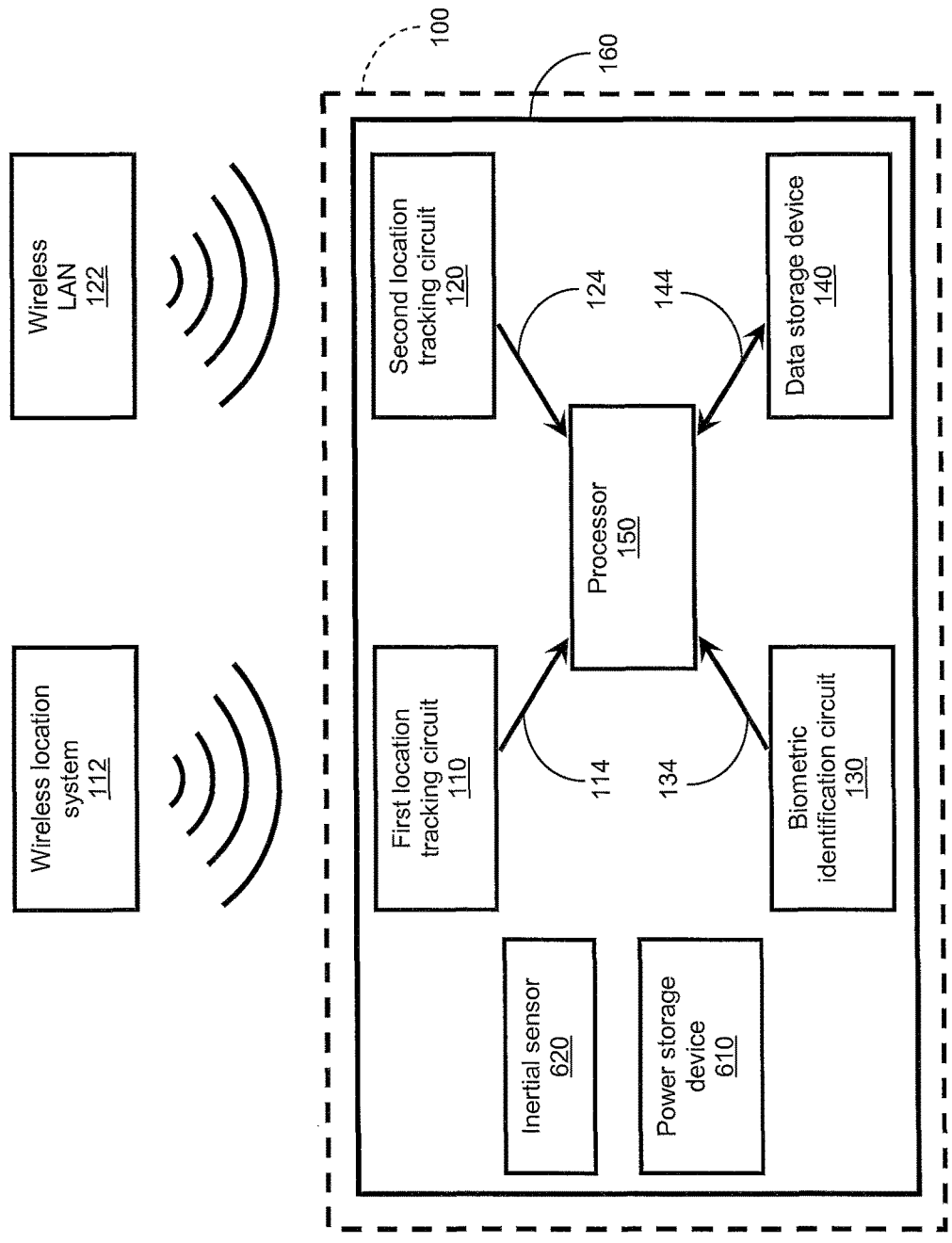
Figure 6C:
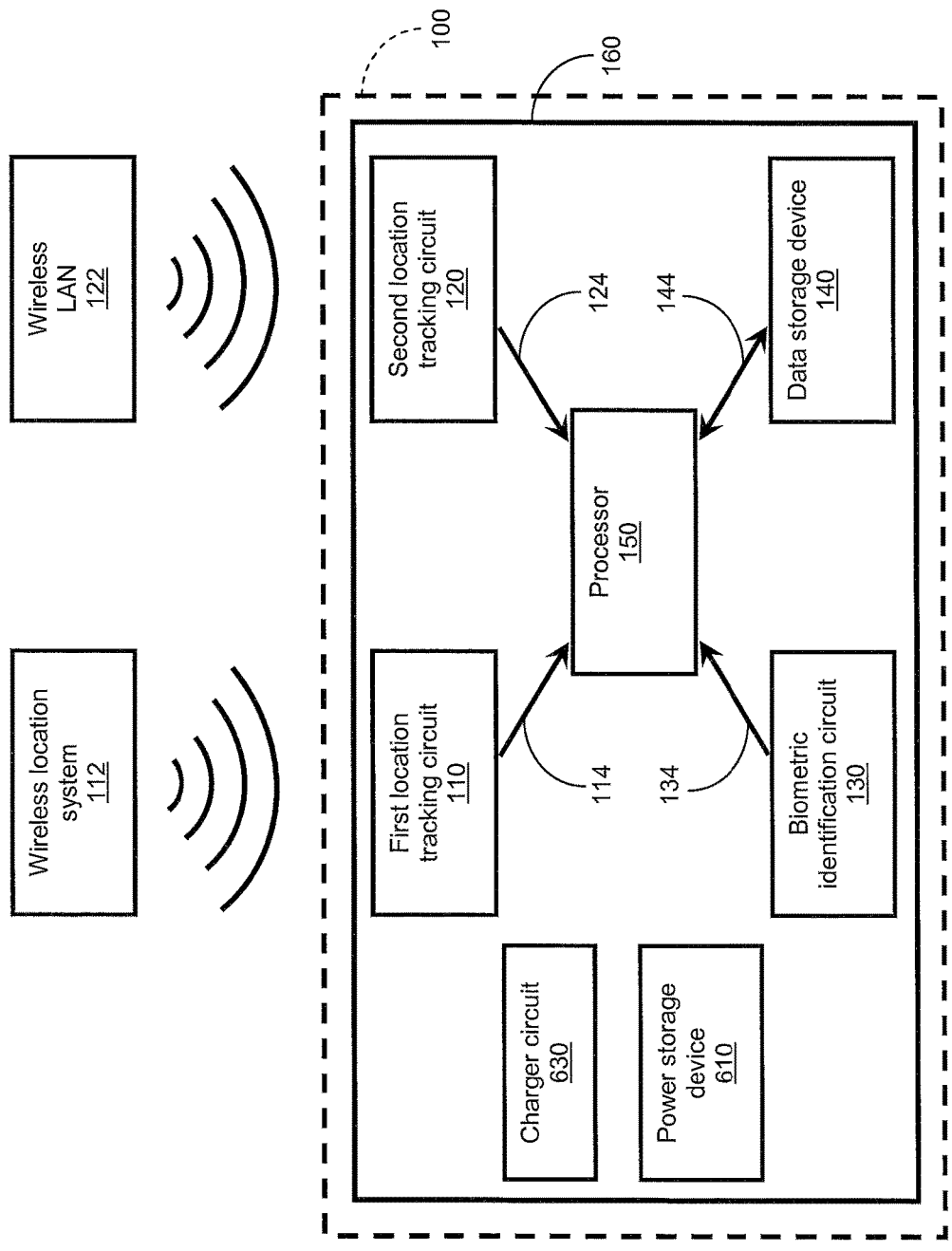

FIGS. 6A-6C schematically illustrate example tracking devices 100 comprising a power storage device 610 in accordance with certain embodiments described herein. The power storage device 610 of certain embodiments is configured to provide power to the first location tracking circuit 110, the second location tracking circuit 120, the at least one biometric sensor 130, the data storage device 140, and the processor 150. Examples of power storage devices 610 compatible with certain embodiments described herein include, but are not limited to, batteries, capacitors, and fuel cells.

The example tracking device 100 of FIG. 6B further comprises at least one inertial sensor 620 configured to generate a signal (not shown) indicative of movement (e.g., an acceleration) of the tracking device 100. Examples of inertial sensors compatible with certain embodiments described herein include, but are not limited to, accelerometers (e.g., three-axis accelerometers; six-axis accelerometer/gyroscope). The processor 150 is further configured to control power flow from the power storage device 610 in response at least in part to the signal from the at least one inertial sensor 620 (e.g., indicative of the acceleration of the tracking device 100). For example, the processor 150 can be configured to only allow power to flow from the power storage device 610 to the other components of the tracking device 100 (e.g., the first location tracking circuit 110, the second location tracking circuit 120, the at least one biometric identification circuit 130, and/or the data storage device 140) upon the at least one inertial sensor 620 detecting that the tracking device 100 has moved (e.g., has undergone an acceleration).

In certain embodiments, the processor 150 can be configured to activate the first location tracking circuit 110 and/or the second location tracking circuit 120 in response to signals received from the at least one inertial sensor 620. For example, if the tracking device 100 is idle (e.g., stationary; not undergoing acceleration), then power can be conserved by not scanning for signals from the wireless location system 112 and/or the wireless LAN 122. If the signals from the at least one inertial sensor 620 indicate movement (e.g., acceleration) of the tracking device 100, the processor 150 of certain embodiments can trigger repeated operation of one or both of the first location tracking circuit 110 and the second location tracking circuit 120 at a rate that corresponds appropriately (e.g., is linearly proportional) to the speed (e.g., magnitude) of the detected movement (e.g., acceleration) of the tracking device 100 (e.g., faster movements along longer distances or higher accelerations would result in more frequent operation of one or both of the first location tracking circuit 110 and the second location tracking circuit 120). In this way, certain embodiments can advantageously conserve or preserve power stored by the power storage device 610 (e.g., extending the battery life of the tracking device 100) by only providing power to the other components (e.g., the location tracking circuits) when motion of the tracking device 100 has been detected and at a rate appropriate for the detected movement of the tracking device 100. In certain embodiments in which the user presses a "panic" button initiating an "emergency mode," the processor 150 can trigger repeated operation of one or both of the first location tracking circuit 110 and the second location tracking circuit 120 at an appropriate rate (e.g., faster than during non-emergency operation).

The example tracking device 100 of FIG. 6C further comprises at least one charger circuit 630 configured to supply power to the power storage device 610. Examples of charger circuits 630 compatible with certain embodiments described herein include, but are not limited to, solar chargers, wireless inductive chargers, NFC chargers, energy harvesting chargers (e.g., RF, thermal, light) or combinations thereof. For example, the tracking device 100, including the first location tracking circuit 110, the second location tracking circuit 120, the biometric identification circuit 130, the data storage device 140, the processor 150, a LoRa WAN communication circuit 410, and the RFID circuit 510 can run indefinitely on solar power. For another example, an NFC charging circuit can be used to charge the tracking device 100, and can be used to receive enough power (e.g., in 10 seconds) to start the biometric identification circuit 130 as well as the RFID circuit 510. In this way, certain embodiments can advantageously enable the tracking device 100 to be charged in remote locations and/or locations where power is not otherwise available.

Figure 7:
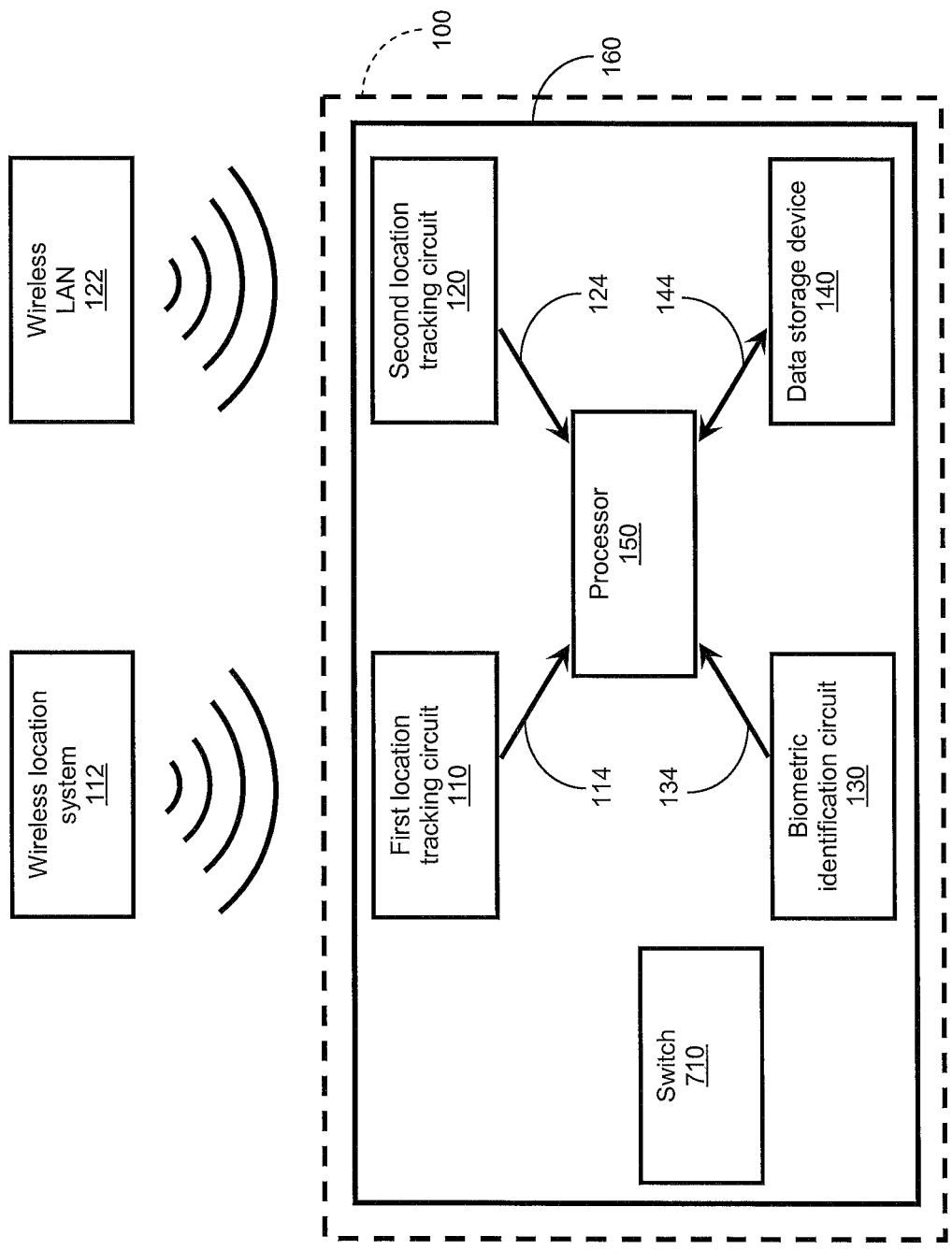
FIG. 7 schematically illustrates an example tracking device comprising a switch in accordance with certain embodiments described herein.

FIG. 7 schematically illustrates an example tracking device 100 comprising a switch 710 in accordance with certain embodiments described herein. In certain embodiments, the switch 710 is configured to be actuated by the user and is in operative communication with the processor 150. The processor 150 of certain embodiments is further configured to wirelessly transmit the information regarding the location of the tracking device 100 in real time to a location tracking system, as described herein, in response at least in part to actuation of the switch 710. Examples of switches compatible with certain embodiments described herein include, but are not limited to, push buttons and toggle switches.

In certain embodiments in which the tracking device 100 is to be used for accessing restricted areas of an airport, the tracking device 100 can advantageously provide real-time location information of the staff member to whom the tracking device 100 is assigned. The tracking device 100 can also advantageously generate alerts based on suspicious activities (e.g., attempts at unauthorized access or other use of the tracking device 100). By utilizing biometric authentication for access control (e.g., conditioning or gating operation of the RFID circuit 510 upon successfully determining that the user is an authorized user; disabling the RFID circuit 510 if the biometric authentication determines that the user is not an authorized user), certain embodiments can advantageously provide an added layer of security. In addition, certain embodiments can advantageously provide a distress call alarm and location information upon the user actuating an alarm switch (e.g., push button) of the tracking device 100.

In certain embodiments in which the tracking device 100 is to be used for accessing restricted areas of a healthcare facility and/or tracking the locations of patients, the tracking device 100 can advantageously provide real-time location information of the staff member or the patient to whom the tracking device 100 is assigned. The tracking device 100 can also advantageously generate alerts based on suspicious activities (e.g., attempts at unauthorized access or other use of the tracking device 100). By utilizing biometric authentication for access control (e.g., conditioning or gating operation of the RFID circuit 510 upon successfully determining that the user is an authorized user; disabling the RFID circuit 510 if the biometric authentication determines that the user is not an authorized user), certain embodiments can advantageously provide an added layer of security. In addition, certain embodiments can advantageously provide a distress call alarm and location information upon the user actuating an alarm switch (e.g., push button) of the tracking device 100.

In certain embodiments in which the tracking device 100 is to be used for accessing restricted areas of a military installation or a prison, the tracking device 100 can advantageously provide real-time location information of the individual (e.g., service member; guard; prisoner) to whom the tracking device 100 is assigned and can provide a link to security surveillance. The tracking device 100 can also advantageously generate alerts based on suspicious activities (e.g., attempts at unauthorized access or other use of the tracking device 100). By utilizing biometric authentication for access control (e.g., conditioning or gating operation of the RFID circuit 510 upon successfully determining that the user is an authorized user; disabling the RFID circuit 510 if the biometric authentication determines that the user is not an authorized user), certain embodiments can advantageously provide an added layer of security.

In certain embodiments in which the tracking device 100 is to be used at a school or higher education campus, by using the biometric authentication, the tracking device 100 can advantageously provide attendance information. For example, a teacher or professor in the classroom can ask each student in the classroom attending the class to use the fingerprint sensor of his/her tracking device 100 to determine that the student is the authorized user of the tracking device 100, and, in response to the student being the authorized user, send a transmitted signal (e.g., via Bluetooth) from the tracking device 100 to the location tracking system. In this way, the tracking device 100 can advantageously avoid having other students who are not physically present in the class from faking their attendance. The teacher/professor can use a laptop, handheld, tablet, or other mobile device to read the results from the location tracking system (e.g., to compare against the class list for headcounts, and determination of who is missing). In addition, certain embodiments can advantageously provide a distress call alarm and location information upon the user actuating an alarm switch (e.g., push button) of the tracking device 100, and/or secure access to dorms, parking, labs, and other restricted areas.

Figure 8:
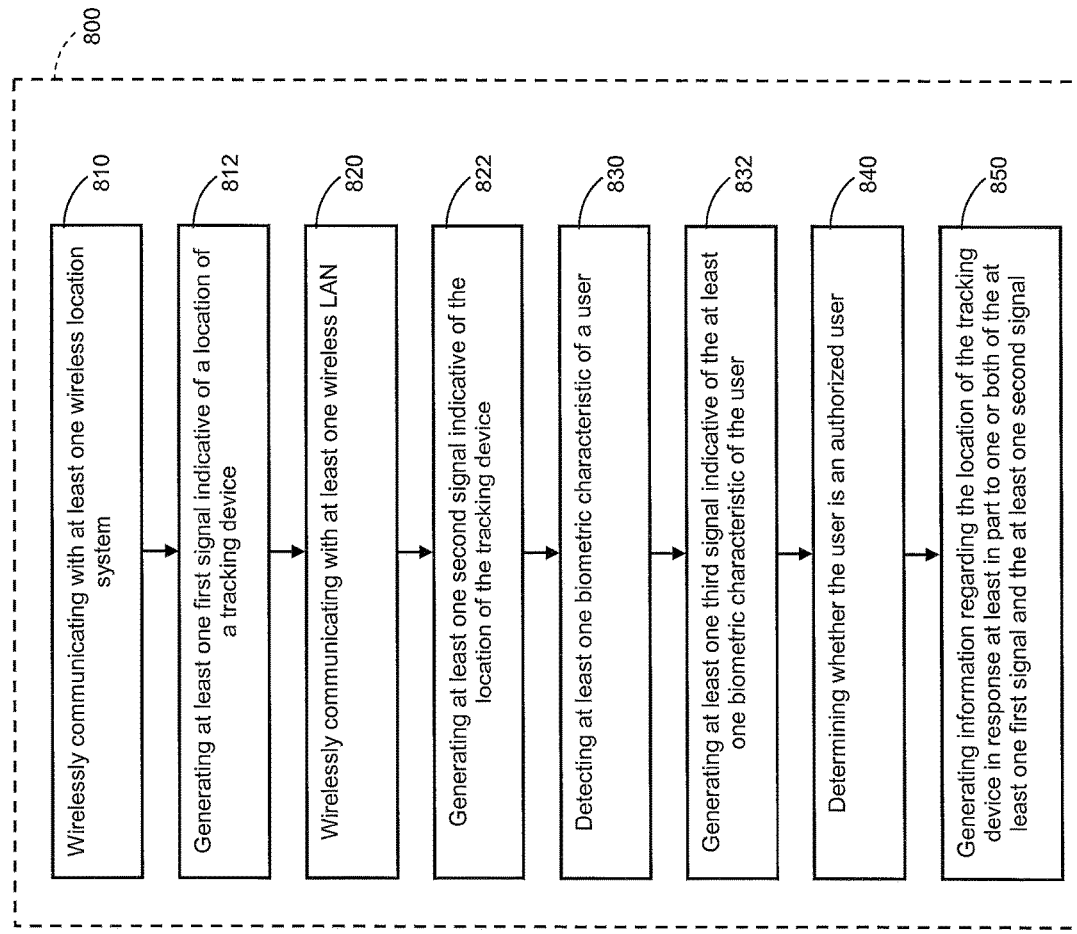
FIG. 8 is a flow diagram of an example method for tracking in accordance with certain embodiments described herein.

FIG. 8 is a flow diagram of an example method 800 for tracking in accordance with certain embodiments described herein. While the method 800 is described below with references to the example tracking device 100 and its components as schematically illustrated in FIG. 1, other systems and devices may be used instead or in combination with the example tracking device 100 and its components.

In an operational block 810, the method 800 comprises wirelessly communicating with at least one wireless location system 112 (e.g., by using a first location tracking circuit 110). In an operational block 812, the method 800 further comprises generating at least one first signal 114 indicative of a location of a tracking device using wireless communications with the at least one wireless location system 112. In an operational block 820, the method 800 further comprises wirelessly communicating with at least one wireless local-area network (LAN) 122 (e.g., using a second location tracking circuit 120). In an operational block 822, the method 800 further comprises generating at least one second signal 124 indicative of the location of the tracking device 100 using wireless communications with the at least one wireless LAN 122. In an operational block 830, the method 800 further comprises detecting at least one biometric characteristic of a user (e.g., using a biometric identification circuit 130). In an operational block 832, the method 800 further comprises generating at least one third signal 134 indicative of the at least one biometric characteristic of the user.

In an operational block 840, the method 800 further comprises determining whether the user is an authorized user (e.g., an authorized user of the tracking device 100). For example, a processor 150 can determine whether the user is an authorized user in response at least in part to a comparison of the at least one third signal 134 and at least one previously-stored fourth signal 144 indicative of at least one biometric characteristic of an authorized user. In certain embodiments, the method 800 can further comprise previously storing the at least one fourth signal 144 indicative of at least one biometric characteristic of an authorized user (e.g., using a data storage device 140). In an operational block 850, the method 800 further comprises generating information regarding the location of the tracking device 100 in response at least in part to one or both of the at least one first signal 112 and the at least one second signal 122 (e.g., using a processor 150). In certain embodiments, generating information regarding the location of the tracking device 100 is performed in response to determining that the user is an authorized user in the operational block 840.

Figure 9:
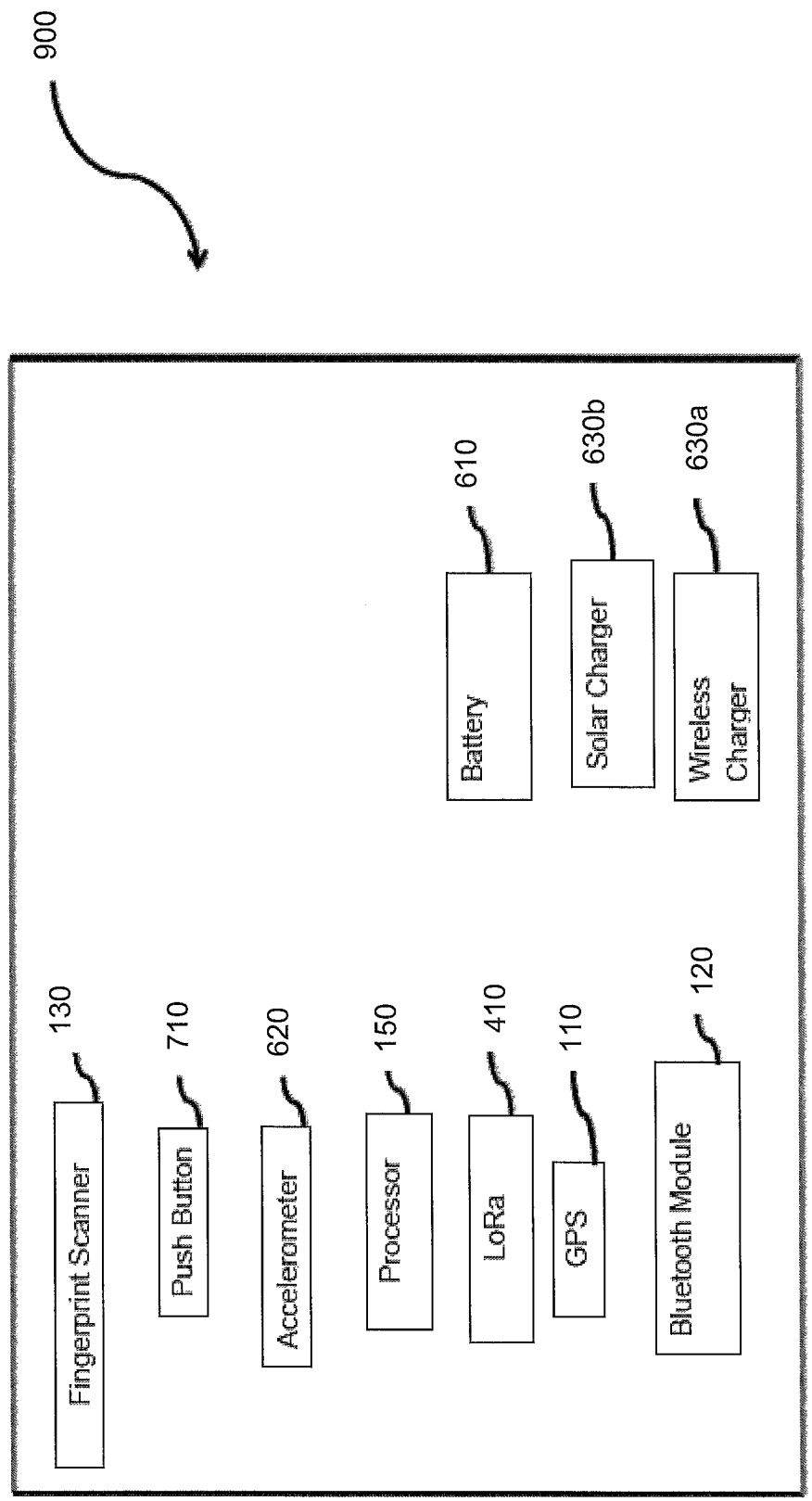
FIG. 9 schematically illustrates an example configuration of a device in accordance with certain embodiments described herein.

Various configurations of a device are described in FIGS. 9-16, at least some of which are compatible with certain embodiments described herein. For example, FIG. 9 schematically illustrates an example configuration of a device 900 comprising multiple components: a Global Positioning System (GPS) circuit (an example of a first location tracking circuit 110), a Bluetooth circuit (an example of a second location tracking circuit 120), a Long Range (LoRa) circuit (an example of a communication circuit 410), a fingerprint scanner (an example of a biometric identification circuit 130), a processor 150, a battery (an example of a power storage device 610), an accelerometer (an example of an inertial sensor 620), a wireless charger (an example of a charger circuit 630a) and a solar charger (an example of a charger circuit 630b), and a push button (an example of a switch 710). The various components of the devices schematically illustrated in FIGS. 9-16 may be combined together in various combinations, at least some of which are compatible with certain embodiments described herein. In some of these configurations, all of these components, and other internal components, can be contained in a waterproof enclosure.

In at least some of these configurations, the device has small physical dimensions (e.g., small compact credit card dimensions) while containing all the internal components in a waterproof enclosure. For example, the internal circuitry can comprise a printed circuit board (PCB) that has a length in a range of 20 mm to 80 mm, a width in a range of 20 mm to 50 mm, and a thickness in a range of 0.5 mm to 3.0 mm (e.g., about 0.63 mm), while comprising a LoRa circuit (e.g., with a custom antenna), a GPS circuit (e.g., with a custom antenna), a wireless communication circuit (e.g., a Bluetooth circuit; a Bluetooth low energy circuit) (e.g., with an antenna), a fingerprint scanner circuit (e.g., placed over a push button), an accelerometer circuit, a wireless battery, and a solar charger.

FIG. 9 schematically illustrates an example configuration of a device 900 in accordance with certain embodiments described herein. For example, a PCB can comprise the first location tracking circuit 110 (e.g., the GPS module), the second location tracking circuit 120 (e.g., the Bluetooth module and its custom antenna), the communication circuit 410 (e.g., LoRa module and its custom antenna), the processor 150, the biometric identification circuit 130 (e.g., a fingerprint scanner) placed over the switch 710 (e.g., push button), inertial sensor 620 (e.g., accelerometer), and one or more charging circuits 630 (e.g., wireless charger 630*a* and solar charger 630*b*). In certain embodiments, the processor 150 can be in electronic communication with the Bluetooth module, fingerprint scanner, GPS module, accelerometer, and push button.

In certain embodiments, the wireless charger 630*a* and the solar charger 630*b* can be used to provide independent power for the device, in particular in remote locations or locations where an external power source may not be readily available. In certain embodiments, the GPS module can be used for its accuracy and outdoor tracking capabilities. In certain embodiments, the fingerprint scanner provides an additional level of security. For example, if the device is lost, by conditioning or gating operation of the device upon a successful match by the fingerprint scanner showing that the user is an authorized user, an individual who finds the lost device can be prevented from using the device (e.g., to gain access to the user's home or to charge purchases against the card owner's credit account).

Figure 10:
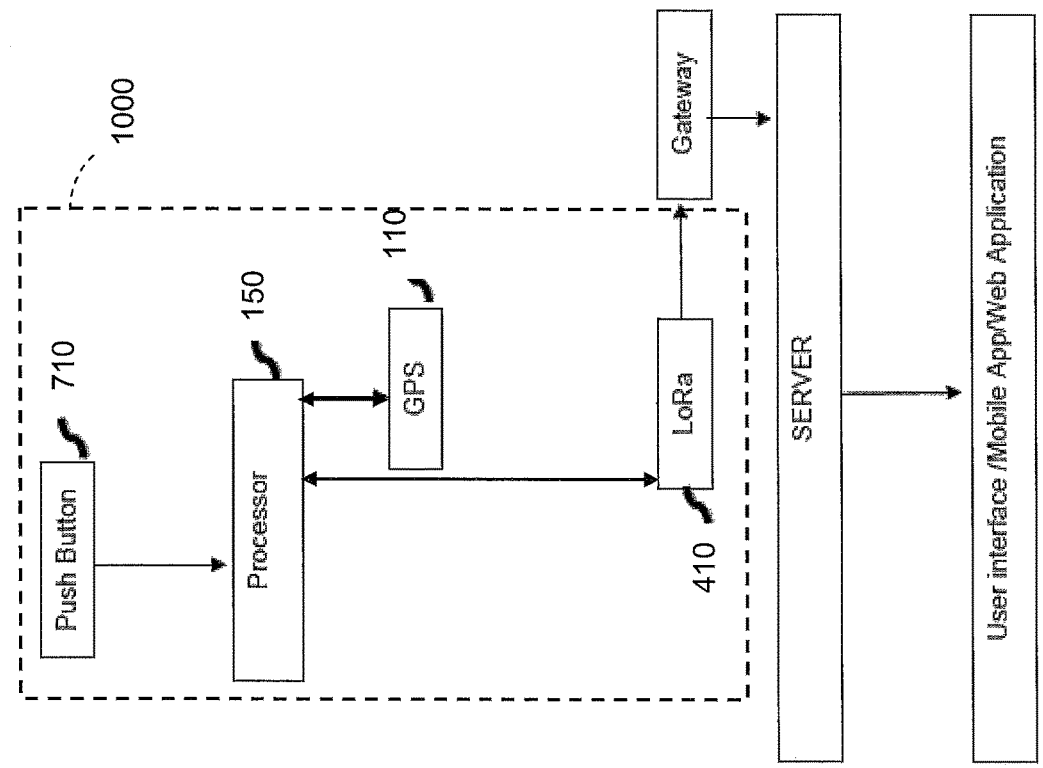
FIG. 10 schematically illustrates an example configuration of a device that can be used in distress sign case use.

FIG. 10 schematically illustrates an example configuration of a device 1000 that can be used in a distress sign case use. For example, a user can engage the push button 710, after which the processor 150 can determine the next steps (e.g., perform initial check for valid terminals of the wireless LAN 122, if none detected, then search for GPS signals; determining the frequency of searching for valid terminals and/or GPS signals based on the speed or acceleration provided by the inertial sensor 620). The device 1000 can use the GPS module 110, as well as the LoRa module 410 (e.g., detecting three or more beacon signals from terminals in proximity to the device 1000 for triangulation), to get a fix on its current location, and can use the LoRa module 410 to communicate the information regarding the location of the device 1000 to the LoRa gateway, which sends the information regarding the location of the device 1000 to the server, and is then displayed on the user interface (e.g., showing an indoor footprint and/or general map of outdoor locations, with a location of the device 1000 plotted on the footprint and/or map accordingly).

Figure 11:
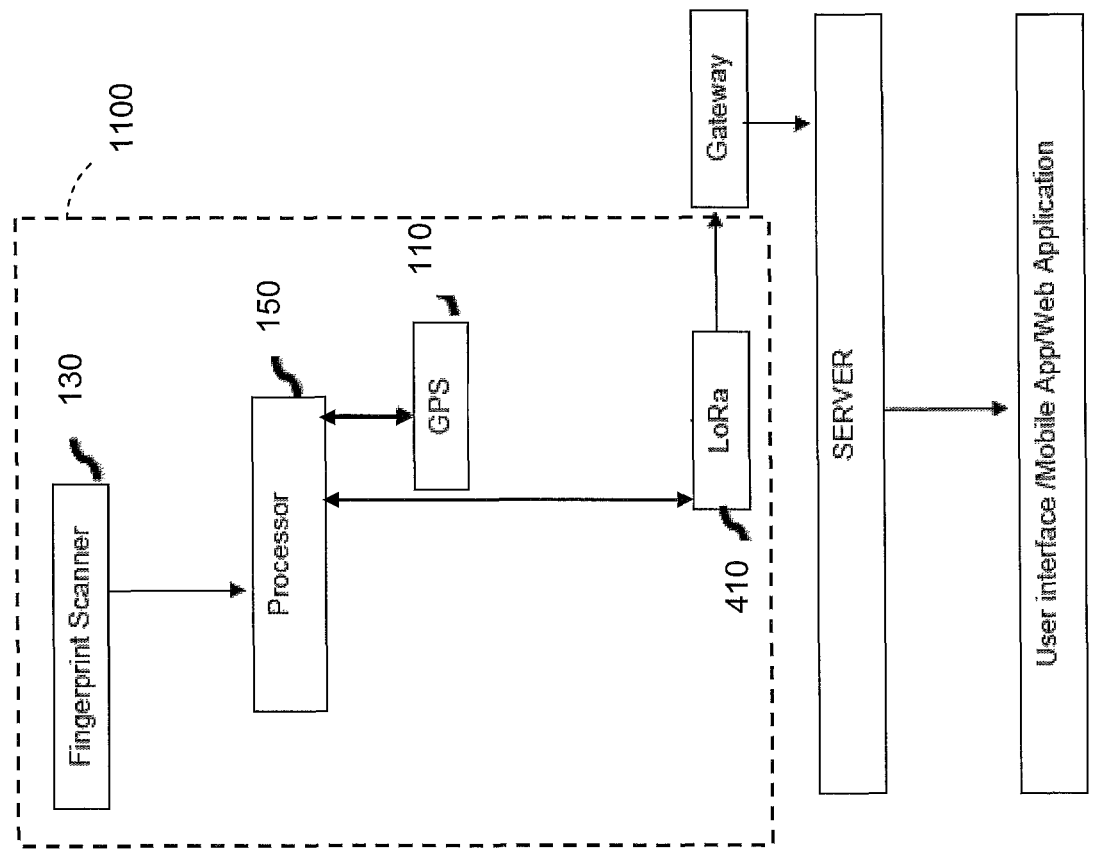
FIG. 11 schematically illustrates an example configuration of a device that can be used in a secure tracker for humans case use.

FIG. 11 schematically illustrates an example configuration of a device 1100 that can be used in a secure tracker for humans case use. In certain embodiments, a user can first scan his/her fingerprint for authentication using the fingerprint scanner 130, after which the processor 150 can determine the next steps (e.g., determining whether the user is an authorized user of the device 1100; perform initial check for valid terminals of the wireless LAN 122, if none detected, then search for GPS signals; determining the frequency of searching for valid terminals and/or GPS signals based on the speed or acceleration provided by the inertial sensor 620). The device 1100 can use the GPS module 110, as well as the LoRa module 410 (e.g., detecting three or more beacon signals from terminals in proximity to the device 1100 for triangulation), to get a fix on its current location, and can use the LoRa module 410 to communicate the information regarding the location of the device 1100 to the LoRa gateway, which sends the information regarding the location to the server, and is then displayed on the user interface (e.g., showing an indoor footprint and/or general map of outdoor locations, with a location of the device 1100 plotted on the footprint and/or map accordingly).

Figure 12:
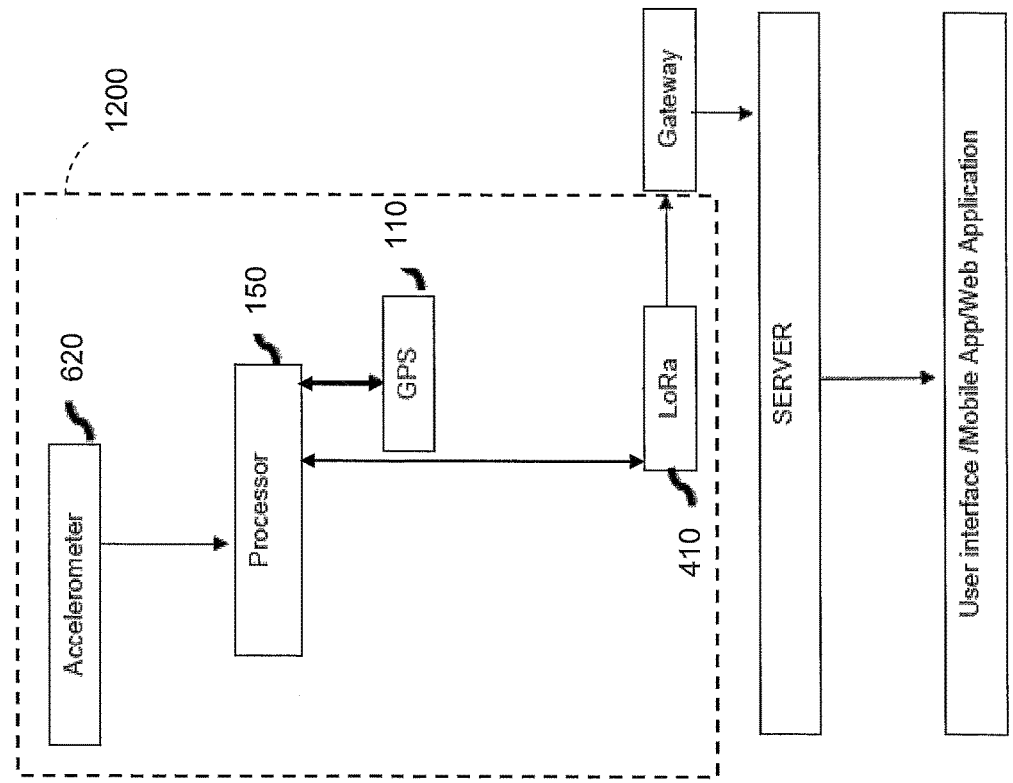
FIG. 12 schematically illustrates an example configuration of a device that can be used in a human tracker case use.

FIG. 12 schematically illustrates an example configuration of a device 1200 that can be used in a human tracker case use. In certain embodiments, the device 1200 can determine if there is any movement of the device 1200 using the accelerometer 620, after which the processor 150 can determine the next steps (e.g., using the accelerometer 620 to detect whether the device 1200 has undergone an acceleration, and if so, transition the device 1200 from an idle "sleep mode" to an operational mode; determine whether the detected acceleration is sufficiently abrupt to be indicative of a fall by the user or other emergency event and in response send an alert signal via the LoRa module 410; perform initial check for valid terminals of the wireless LAN 122, if none detected, then search for GPS signals; determining the frequency of searching for valid terminals and/or GPS signals based on the speed or acceleration provided by the inertial sensor 620). The device 1200 can use the GPS module 110, as well as the LoRa module 410 (e.g., detecting three or more beacon signals from terminals in proximity to the device 1200 for triangulation), to get a fix on its current location, and can use the LoRa module 410 to communicate the information regarding the location of the device 1200 to the LoRa gateway, which sends the information regarding the location to the server, and is then displayed on the user interface (e.g., showing an indoor footprint and/or general map of outdoor locations, with a location of the device 1200 plotted on the footprint and/or map accordingly).

Figure 13:
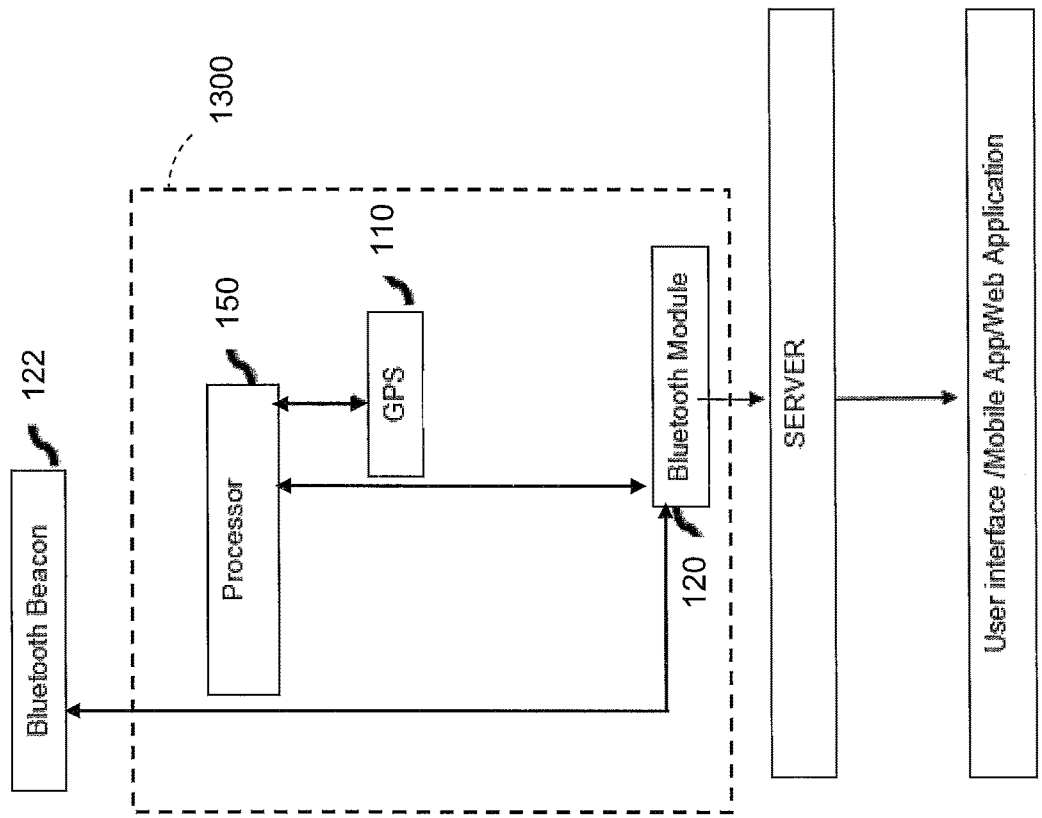
FIG. 13 schematically illustrates an example configuration of a device that can be used in a proximity case use.

FIG. 13 schematically illustrates an example configuration of a device 1300 that can be used in a proximity case use. In certain embodiments, the processor 150 can use the Bluetooth module as the second location tracking circuit 120 and can determine if the device 1300 is in proximity of the Bluetooth beacon 122. The device 1300 can also use the Bluetooth module as a communication circuit to send this proximity information to the server, and it is then displayed on the user interface (e.g., showing an indoor footprint and/or general map of outdoor locations, with a location of the device 1300 plotted on the footprint and/or map accordingly).

Figure 14:
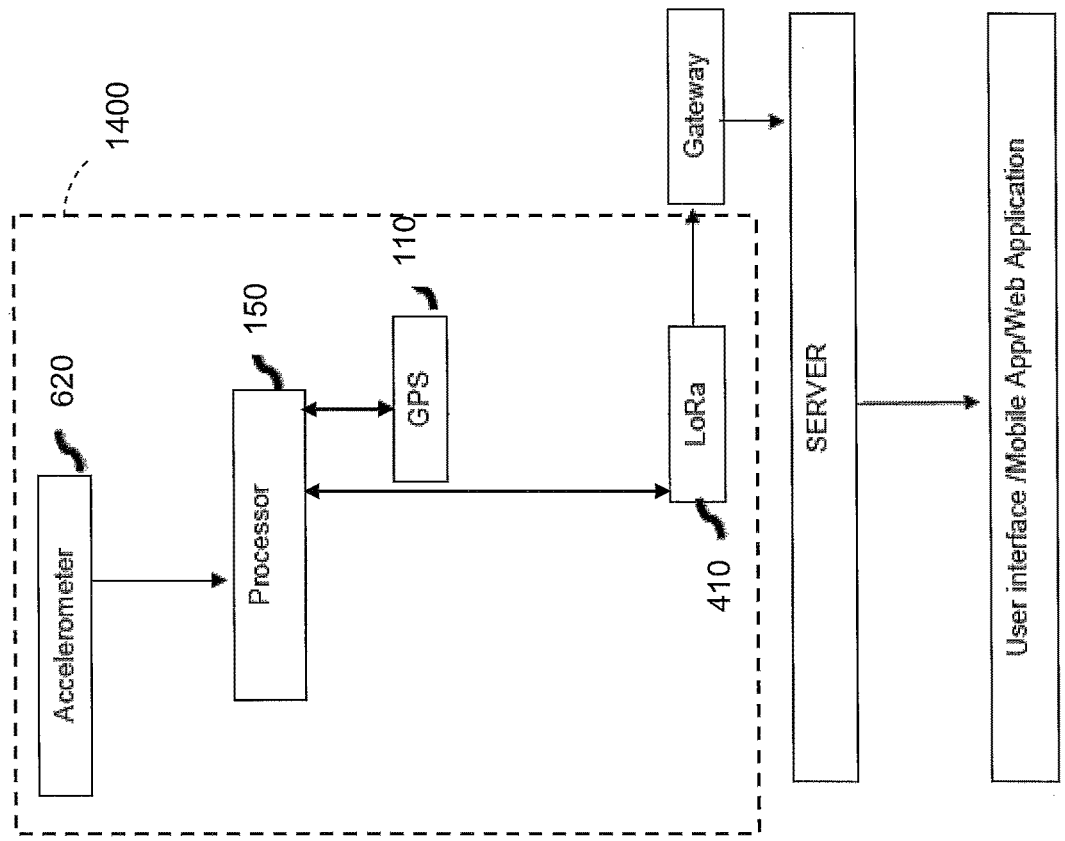
FIG. 14 schematically illustrates an example configuration of a device that can be used in a tracking object case use.

FIG. 14 schematically illustrates an example configuration of a device 1400 that can be used in a tracking object case use. In certain embodiments, the device 1400 can determine if there is any movement of the device 1400 using the accelerometer 620, after which the processor 150 can determine the next steps (e.g., using the accelerometer 620 to detect whether the device 1400 has undergone an acceleration, and if so, transition the device 1400 from an idle "sleep mode" to an operational mode; determine whether the detected acceleration is sufficiently abrupt to be indicative of a fall by the user or other emergency event and in response send an alert signal via the LoRa module 410; perform initial check for valid terminals of the wireless LAN 122, if none detected, then search for GPS signals; determining the frequency of searching for valid terminals and/or GPS signals based on the speed or acceleration provided by the inertial sensor 620). The device 1400 can use the GPS module 110, the Bluetooth module 120, or the LoRa module 410 (e.g., detecting three or more beacon signals from terminals in proximity to the device 1400 for triangulation), to get a fix on its current location, and can use the LoRa module 410 to communicate the information regarding the location of the device 1400 to the LoRa gateway, which sends the information regarding the location to the server, and is then displayed on the user interface (e.g., showing an indoor footprint and/or general map of outdoor locations, with a location of the device 1200 plotted on the footprint and/or map accordingly).

Figure 15:
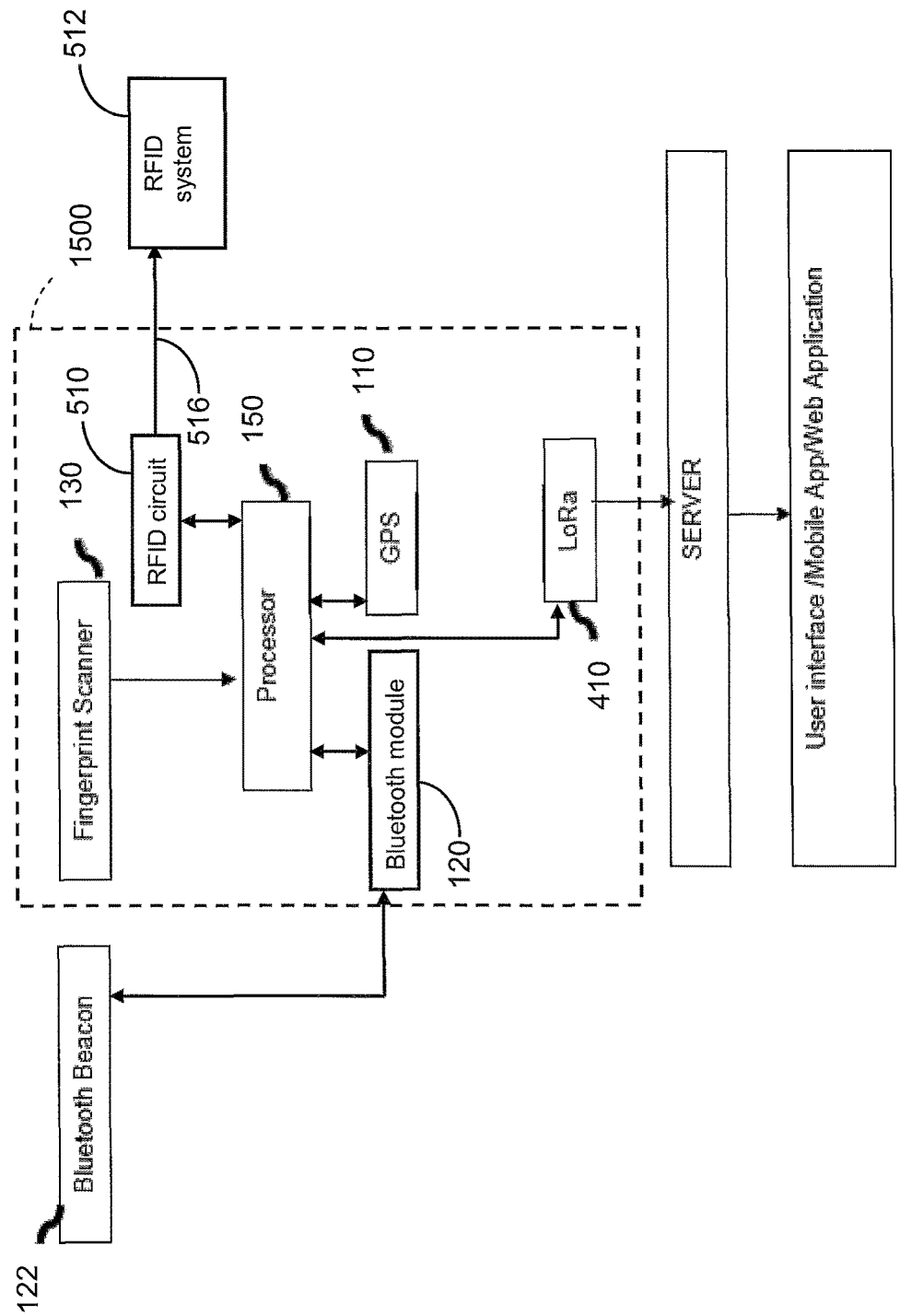
FIG. 15 schematically illustrates an example configuration of a device that can be used in a smart secure access card case use.

FIG. 15 schematically illustrates an example configuration of a device 1500 that can be used in a smart secure access card case use. In certain embodiments, a user can first scan his/her fingerprint for authentication using the fingerprint scanner 130, after which the processor 150 can determine the next steps (e.g., determining whether the user is an authorized user of the device 1500; only if user is an authorized user, enable RFID circuit 510 to send an identification signal 516 to the RFID system 512 and/or perform initial check for valid terminals of the wireless LAN 122, if none detected, then search for GPS signals). The processor 1500 can use the Bluetooth module 120 and can determine if the device 1500 is in proximity of the Bluetooth terminal 122. The device 1500 can also use the Bluetooth module 120 to send this proximity information to the server, and it is then displayed on the user interface, or for example, to open a locked door operationally coupled to the RFID system 512.

Figure 16:
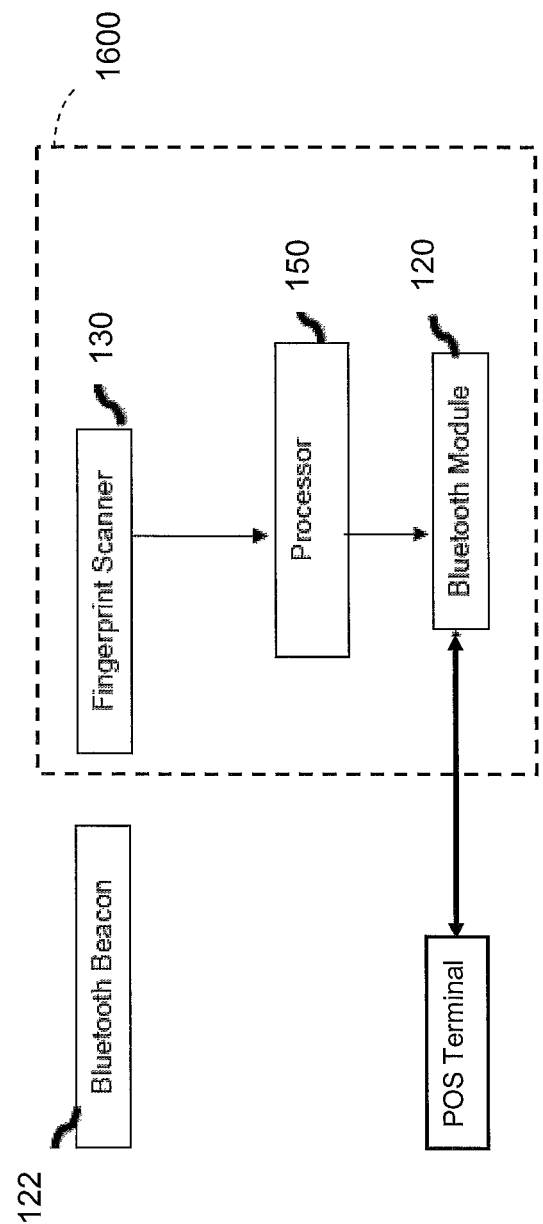
FIG. 16 schematically illustrates an example configuration of a device that can be used in a secure mobile payment case use.

FIG. 16 schematically illustrates an example configuration of a device 1600 that can be used in a secure mobile payment case use. In certain embodiments, a user can first scan his/her fingerprint for authentication using the fingerprint scanner 130, after which the processor 1600 can determine the next steps (e.g., determining whether the user is an authorized user of the device 1600; only if user is an authorized user, enable the Bluetooth module 120 via near-field communications (NFC) to communicate with the Point of Sale terminal and/or perform initial check for valid terminals of the wireless LAN 122, if none detected, then search for GPS signals). The processor 150 can then process the information and the Bluetooth module 120 can communicate the information to the Point of Sale (POS) terminal to authenticate the purchase.

Although commonly used terms are used to describe the systems and methods of certain embodiments for ease of understanding, these terms are used herein to have their broadest reasonable interpretation, as described in more detail herein. Although various aspects of the disclosure will be described with regard to illustrative examples and embodiments, one skilled in the art will appreciate that the disclosed embodiments and examples should not be construed as limiting. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

In this description, reference is made to the drawings, wherein like parts are designated with like reference numerals throughout. As used in the description herein and throughout, the meaning of "a," "an," and "said" includes plural reference unless the context clearly dictates otherwise. Also, as used in the description herein, the meaning of "in" includes "into" and "on," unless the context clearly dictates otherwise. Numbers preceded by a term such as "approximately," "about," and "substantially" as used herein include the recited numbers, and represent an amount close to the stated amount that still performs a desired function or achieves a desired result. For example, as used herein, the terms "approximately," "substantially," and "about" in conjunction with a numeral may refer to a range of that numeral starting from 10% below the absolute of the numeral to 10% above the absolute of the numeral, inclusive, a range of that numeral starting from 5% below the absolute of the numeral to 5% above the absolute of the numeral, inclusive, or a range of that numeral starting from 1% below the absolute of the numeral to 1% above the absolute of the numeral, inclusive. The ranges disclosed herein also encompass any and all overlap, sub-ranges, and combinations thereof. Language such as "up to," "at least," "greater than," less than," "between," and the like includes the number recited.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention.

What is claimed is:

1. A tracking device comprising:
a first location tracking circuit configured to wirelessly communicate with at least one wireless location system and to generate at least one first signal indicative of a location of the tracking device using wireless communications with the at least one wireless location system;
a second location tracking circuit configured to wirelessly communicate with at least one wireless local-area network and to generate at least one second signal indicative of the location of the tracking device using wireless communications with the at least one wireless local-area network;
at least one biometric identification circuit configured to detect at least one biometric characteristic of a user and to generate at least one third signal indicative of the at least one biometric characteristic of the user;
a data storage device configured to store at least one fourth signal indicative of at least one biometric characteristic of an authorized user of the tracking device;
a radio-frequency identification (RFID) circuit configured to wirelessly transmit at least one identification signal to an RFID system securing a restricted area, the RFID system configured to allow the user to access the restricted area in response at least in part to the at least one identification signal indicating that the authorized user of the tracking device is authorized to access the restricted area; and
a processor in operative communication with the first location tracking circuit, the second location tracking circuit, the at least one biometric identification circuit, the RFID circuit, and the data storage device, the processor configured to:

generate information regarding the location of the tracking device in response at least in part to one or both of the at least one first signal and the at least one second signal, determine whether the user is the authorized user of the tracking device in response at least in part to a comparison of the at least one third signal and the at least one fourth signal, control transmission of the at least one identification signal by the RFID circuit to the RFID system by allowing transmission of the at least one identification signal by the RFID circuit when the user is the authorized user of the tracking device and preventing transmission of the at least one identification signal by the RFID circuit when the user is not the authorized user of the tracking device, and control at least one of the first location tracking circuit and the second location tracking circuit in response to the comparison of the at least one third signal and the at least one fourth signal.

2. The tracking device of claim 1, wherein the at least one wireless location system comprises a global positioning and navigation satellite network system and the at least one wireless local-area network comprises at least one of a WiFi network and a Bluetooth network.

3. The tracking device of claim 1, wherein the processor is further configured to wirelessly transmit the information regarding the location of the tracking device in real time to a location tracking system.

4. The tracking device of claim 3, wherein the processor is further configured to wirelessly transmit the information regarding the location of the tracking device in real time to the location tracking system in response at least in part to the comparison of the at least one third signal and the at least one fourth signal.

5. The tracking device of claim 3, wherein the processor is further configured to wirelessly transmit the information regarding the location of the tracking device via a wireless local-area network.

6. The tracking device of claim 1, wherein the first location tracking circuit comprises at least one antenna and the second location tracking circuit comprises the at least one antenna, the at least one antenna configured to wirelessly communicate with the at least one wireless location system and the at least one wireless local-area network.

7. The tracking device of claim 1, wherein the at least one biometric identification circuit comprises a fingerprint scanner and the at least one biometric characteristic of the user comprises a fingerprint pattern of the user.

8. The tracking device of claim 1, further comprising a communication circuit in operable communication with the processor and configured to be in operable communication with a wireless low-power wide-area network in operable communication with a location tracking system, the processor further configured to transmit the information regarding the location of the tracking device via the communication circuit to the location tracking system.

9. The tracking device of claim 8, wherein the wireless low-power wide-area network comprises a LoRa wide-area network.

10. The tracking device of claim 1, further comprising a power storage device configured to provide power to the first location tracking circuit, the second location tracking circuit, the at least one biometric identification circuit, the data storage device, and the processor.

11. The tracking device of claim 10, further comprising at least one inertial sensor configured to generate a signal indicative of an acceleration of the tracking device, wherein the processor is further configured to control power flow from the power storage device in response at least in part to the signal indicative of the acceleration of the tracking device.

12. The tracking device of claim 10, further comprising a charger circuit configured to supply power to the power storage device, the charger circuit comprising a solar charger, a wireless charger, or both.

13. The tracking device of claim 1, further comprising a switch configured to be actuated by the user and in operative communication with the processor, the processor further configured to wirelessly transmit the information regarding the location of the tracking device in real time to a location tracking system in response at least in part to actuation of the switch.

14. A method for tracking, the method comprising:
detecting at least one biometric characteristic of a user of a tracking device;
generating at least one third signal indicative of the at least one biometric characteristic of the user;
determining whether the user is an authorized user of the tracking device in response at least in part to a comparison of the at least one third signal and at least one previously-stored fourth signal indicative of at least one biometric characteristic of the authorized user of the tracking device;
in response to determining that the user is the authorized user of the tracking device:
controlling wireless transmission of at least one radio-frequency identification (RFID) signal to an RFID system securing a restricted area, the RFID system configured to allow the user to access the restricted area in response at least in part to the at least one RFID signal indicating that the authorized user of the tracking device is authorized to access the restricted area, wherein said controlling comprises allowing transmission of the at least one RFID signal when the user is the authorized user of the tracking device and preventing transmission of the at least one RFID signal when the user is not the authorized user of the tracking device; and
generating information regarding a location of the tracking device, wherein said generating comprises one or both of:
wirelessly communicating with at least one wireless location system and generating at least one first signal indicative of the location of the tracking device using wireless communications with the at least one wireless location system; and
wirelessly communicating with at least one wireless local-area network and generating at least one second signal indicative of the location of the tracking device using wireless communications with the at least one wireless local-area network.

15. The method of claim 14, further comprising storing the at least one fourth signal indicative of at least one biometric characteristic of the authorized user.

16. The method of claim 14, further comprising transmitting the information regarding the location of the tracking device to a location tracking system via a communication circuit in communication with a low-power wide-area network in communication with the location tracking system.

17. The method of claim 14, further comprising wirelessly transmitting the information regarding the location of the tracking device to a wireless low-power wide-area network in operable communication with a location tracking system.

18. The method of claim 17, wherein the wireless low-power wide-area network comprises a LoRa wide-area network.

19. The method of claim 17, wherein said wirelessly transmitting the information regarding the location of the tracking device to the location tracking system is performed in real time and in response to determining that the user is the authorized user of the tracking device.

20. The method of claim 14, wherein the at least one wireless location system comprises a global positioning and navigation satellite network system and the at least one wireless local-area network comprises at least one of a WiFi network and a Bluetooth network.

\* \* \* \* \*